(12) United States Patent
Garbark et al.

(10) Patent No.: US 10,793,672 B2
(45) Date of Patent: Oct. 6, 2020

(54) ALKOXYLATED BIO-OIL POLYOL COMPOSITIONS

(71) Applicant: Battelle Memorial Institute, Columbus, OH (US)

(72) Inventors: Daniel Garbark, Blacklick, OH (US); Herman Benecke, Columbus, OH (US); Megan Moore, Hilliard, OH (US); Mark J. Perry, Hilliard, OH (US); Jeffrey T. Cafmeyer, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 15/318,036

(22) PCT Filed: Jun. 11, 2015

(86) PCT No.: PCT/US2015/035443
§ 371 (c)(1),
(2) Date: Dec. 12, 2016

(87) PCT Pub. No.: WO2015/191936
PCT Pub. Date: Dec. 17, 2015

(65) Prior Publication Data
US 2017/0121458 A1 May 4, 2017

Related U.S. Application Data

(60) Provisional application No. 62/011,005, filed on Jun. 11, 2014.

(51) Int. Cl.
*C08G 65/26* (2006.01)
*C10L 1/02* (2006.01)
*C08G 18/66* (2006.01)
*C08G 18/48* (2006.01)
*C08G 18/20* (2006.01)
(Continued)

(52) U.S. Cl.
CPC ....... *C08G 65/2609* (2013.01); *C08G 18/161* (2013.01); *C08G 18/1833* (2013.01);
(Continued)

(58) Field of Classification Search
CPC ............ C08G 65/2609; C08G 65/2648; C08G 65/2606; C08G 65/2603
See application file for complete search history.

(56) References Cited

U.S. PATENT DOCUMENTS 3,468,822 A * 9/1969 Doerge .............. C08G 18/4081
521/151
4,017,474 A * 4/1977 Glasser .............. C08G 18/6492
521/172
(Continued)

FOREIGN PATENT DOCUMENTS

CA 2476476 A1 8/2003
CN 101125919 * 2/2008 ............. C08G 65/26
(Continued)

OTHER PUBLICATIONS

"Optimization Study of Lignin Oxypropylation in View of the Preparation of Polyurethane Rigid Foams" Cateto et al. Ind. Eng. Chem. Res. 2009, 48, 2583-2589.*
(Continued)

*Primary Examiner* — Michael L Leonard
(74) *Attorney, Agent, or Firm* — Benesch, Friedlander, Coplan & Aronoff LLP

(57) ABSTRACT

Methods are provided for producing bio-oil polyols, alkoxylating bio-oil polyols to provide polyols, and for employing the alkoxylated bio-oil polyols for making polymers or copolymers of polyesters or polyurethanes.

17 Claims, 10 Drawing Sheets

(51) Int. Cl.
  C08G 18/18   (2006.01)
  C08G 18/24   (2006.01)
  C08G 18/76   (2006.01)
  C08G 18/16   (2006.01)
  C08G 18/32   (2006.01)
  C08G 101/00  (2006.01)

(52) U.S. Cl.
  CPC ....... *C08G 18/2081* (2013.01); *C08G 18/244* (2013.01); *C08G 18/3206* (2013.01); *C08G 18/4816* (2013.01); *C08G 18/4879* (2013.01); *C08G 18/4883* (2013.01); *C08G 18/6677* (2013.01); *C08G 18/7621* (2013.01); *C08G 18/7671* (2013.01); *C08G 65/2603* (2013.01); *C08G 65/2606* (2013.01); *C08G 65/2648* (2013.01); *C10L 1/02* (2013.01); *C08G 2101/0025* (2013.01); *C08G 2101/0041* (2013.01); *C08G 2101/0083* (2013.01)

(56) References Cited

U.S. PATENT DOCUMENTS

| | | | |
|---|---|---|---|
| 5,618,779 A * | 4/1997 | Klein | C07C 67/26 508/486 |
| 6,239,209 B1 | 5/2001 | Yang et al. | |
| 6,586,523 B1 | 7/2003 | Blum et al. | |
| 6,602,927 B1 | 8/2003 | Rothacker | |
| 8,692,030 B1 * | 4/2014 | Ionescu | C11C 3/00 521/174 |
| 2005/0238815 A1 | 10/2005 | Dvorchak et al. | |
| 2008/0009601 A1 | 1/2008 | Killilea et al. | |
| 2011/0218264 A1 * | 9/2011 | Casati | C08G 18/36 521/157 |
| 2011/0236667 A1 | 9/2011 | Blum et al. | |
| 2011/0269978 A1 | 11/2011 | Garbark et al. | |
| 2013/0041072 A1 | 2/2013 | Sommer et al. | |

FOREIGN PATENT DOCUMENTS

| | | |
|---|---|---|
| GB | 966917 A | 8/1964 |
| WO | 03068879 A1 | 8/2003 |
| WO | 2008086977 A1 | 7/2008 |
| WO | 2011107398 A1 | 9/2011 |

OTHER PUBLICATIONS

CN-101125919, Feb. 2008, English.*
"Processing and properties of rigid polyurethane foams based on bio-oils from microwave-assisted pyrolysis of corn stover" Wu et al. Int. J Argic & Biol Eng. vol. 2 No. 1. Mar. 2009. pp. 40-49.*
"Use of Fasy Pyrolysis Bio-Oils in Synthesis of Polyurethane Foams." Shenoy, Alok; Agblevor, Foster. SBI Science & Technology Review Winter Meeting on Jan. 29, 2013.*
Zhang et al., "liquefaction of biomass and upgrading of bio-oil: a review," Molecules, 24(12), 2250 (2019).
Chukwuneke et al., "Physico-chemical analysis of pyrolyzed bio-oil from *Swietenia macrophylla* (mahogany) wood," Heliyon, 5, e01790 (2019).
An, S. et al. "Traditional Tar Production from the Anatolian Black Pine [*Pinus nigra* Arn. subsp. pallasiana (Lamb.) Holmboe var. pallasiana] and its usages in Afyonkarahisar, Central Western Turkey", J. Ethnobiology Ethnomedicine 10, 29 (2014) doi:10.1186/1746-4269-10-29.
Office Action issued in related Chinese patent application No. 2015800389968, dated Dec. 3, 2108.
International Search Report for PCT Application No. PCT/US2013/061760, dated Feb. 1, 2014.
Written Opinion of the International Searching Authority issued in PCT/US2013/061760.
International Preliminary Report on Patentability issued in PCT/US2013/061760 dated Mar. 31, 2015.
English Machine Translation of Description for WO200306887.
International Preliminary Report on Patentability and Written Opinion issued in PCT/US2014/042016 dated Dec. 15, 2015.
Li Yang et al: "Kraft Lignin-Based Rigid Polyurethane Foam", Journal of Wood Chemistry and Technology,vol. 32, No. 3, pp. 210-224.
Cinelli Patrizia et al: "Green Synthesis of flexible polyurethane foams from liquefied lignin", European Polymer Journal, Pergamon Press Lts. Oxford, GB, vol. 49, No. 6, Apr. 13, 2013, pp. 1174-1184.
Carolina Andreia Cateto et al: "Optimization Study of Lignin Oxypropylation in view of the Preparation of Polyurethane Rigid Foams", Industrial & Engineering Chemistry Research, vol. 48, No. 5, Mar. 4, 2019, pp. 2583-2589.
Guo Zhao-Xia et al: "Polyesters from lignin-2. The copolyesterification of kraft lignin and polyethylene glycols with dicarboxylic acid chlorides", European Polymer Journal, Pergamon Press Ltd. Oxford, GB, vol. 27, No. 11, Jan. 1, 1991, pp. 1177-1180.
Matjaz Kunaver et al: "Liquefaction of wood, synthesis and characterization of liquefied wood polyester derivatives", Journal of Applied Polymer Science, vol. 115, No. 3, Feb. 5, 2010, pp. 1265-1271.
Fei Yu et al: "Liquefaction of Corn Stover and Preparation of Polyester From the Liquefied Polyol", Applied Biochemistry and Biotechnology, vol. 130, No. 1-3, Jan. 1, 2006, pp. 574-585.
International Search Report issued in PCT/US2014/042016 dated Feb. 17, 2015.

* cited by examiner

300

| % Polyol Replacement | 50 | 0 |
|---|---|---|
| Petroleum Polyol | 25 | 50 |
| 53918-50 | 25 | 0 |
| WATER | 2.25 | 2.25 |
| DC193 | 2 | 2 |
| 33LV | 0.5 | 0.5 |
| NIAXA1 | 0.16 | 0.16 |
| M20S | 78.87 | 82.55 |
| Total = | 133.78 | 137.46 |
| Foam Results | | |
| Density | 1.88 | 1.99 |
| Max Load, psi | 111.0±9.9 | 92.3±10 |

| Bio-Oil Polyols | | | | |
|---|---|---|---|---|
| Rigid Foam Data | | | | |
| Sample | % Bio Polyol | Max Load, psi | % Max Strain | Density, PCF |
| SG-360 | 0 | 130.6 | 7.5 | 2.06 |
| 53457-23-20 | 5 | 184.1 | 7.9 | 2.68 |
| 53457-23-20 | 25 | 456.1 | 8.1 | 6.19 |

ALKOXYLATED BIO-OIL POLYOL COMPOSITIONS

CROSS-REFERENCE TO RELATED APPLICATIONS

This application is a national stage filing under 35 U.S.C. § 371 of PCT/US15/35443, filed Jun. 11, 2015, which claims priority from U.S. Provisional Pat. App. No. 62/011,005 filed on Jun. 11, 2014. Each of the above-referenced applications in incorporated by reference herein in its entirety.

BACKGROUND

Biomass such as, for example, lignocellulosic substances (e.g., wood), may be subjected to pyrolysis to create a hot pyrolysis vapor. Bio-oil may be extracted from the hot pyrolysis vapor. Bio-oil from pyrolysis of wood may contain a mixture of water, organic acids, alcohols, aldehydes, phenols, and sugar derivatives. The production and availability of bio-oil and bio-oil derivatives may provide a ready starting material for many chemical transformations. The present application appreciates that developing value added uses for bio-oil and bio-oil derivatives may be a challenging endeavor.

SUMMARY

In one embodiment, an alkoxylated bio-oil polyol is provided. The alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value. The bio-oil polyol may be any bio-oil polyol described herein, for example, an intermediate bio-oil polyol or a polyol bio-oil product.

In one embodiment, a method for preparing an alkoxylated bio-oil polyol is provided. The method may include providing a bio-oil polyol. The method may also include reacting the bio-oil polyol with a cyclic alkylene oxide in the presence of an alkoxylation catalyst under reaction conditions effective to form the alkoxylated bio-oil polyol. The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value. The bio-oil polyol may be any bio-oil polyol described herein, for example, an intermediate bio-oil polyol or a polyol bio-oil product.

In another embodiment, a method for producing a copolymer composition is provided. The method may include providing a polymerization precursor mixture configured to form a polymer in combination with a reagent polyol, e.g., an alkoxylated bio-oil polyol. The method may also include reacting the alkoxylated bio-oil polyol with the polymerization precursor mixture under reaction conditions effective to form the copolymer composition. The alkoxylated bio-oil polyol may be any alkoxylated bio-oil polyol described herein.

In one embodiment, a copolymer composition is provided. The copolymer composition may include a copolymerized alkoxylated bio-oil polyol. The copolymer composition may be copolymerized from any alkoxylated bio-oil polyol described herein.

In another embodiment, a copolymer article is provided. The copolymer article may include a copolymer composition having a copolymerized alkoxylated bio-oil polyol. The copolymer composition may be copolymerized from any alkoxylated bio-oil polyol described herein.

BRIEF DESCRIPTION OF THE DRAWINGS

The accompanying figures, which are incorporated in and constitute a part of the specification, illustrate example methods and compositions, and are used merely to illustrate example embodiments.

DETAILED DESCRIPTION

Figure 1:
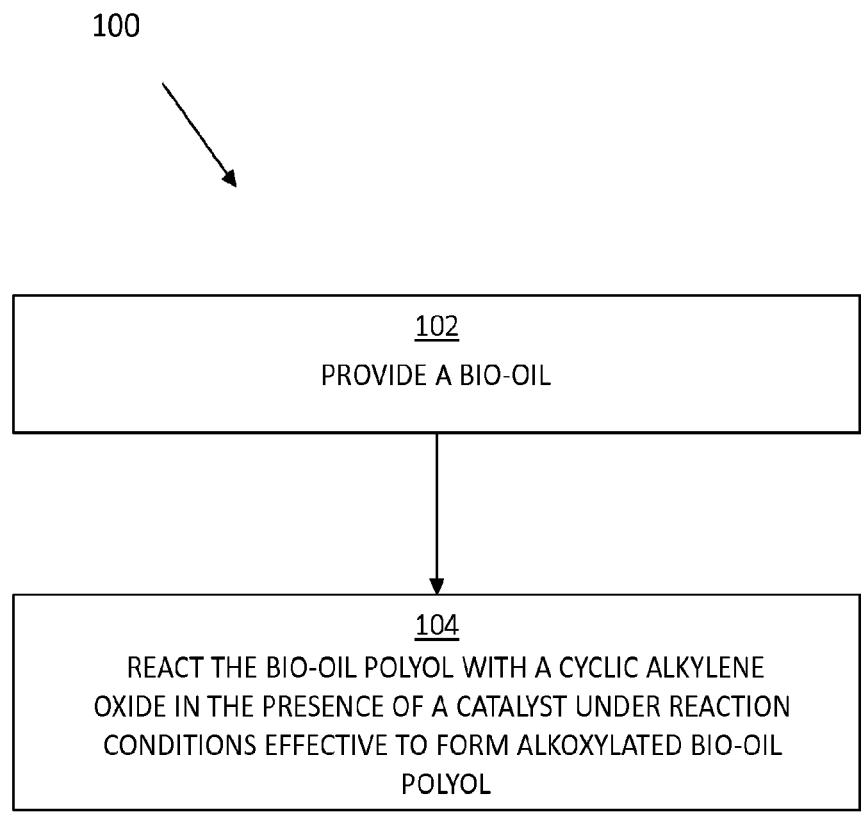
FIG. 1 is a flow diagram of an example method 100 for preparing an alkoxylated bio-oil polyol.

Bio-oil produced from the pyrolysis of wood or other lignocellulosic biomass may contain many components, including water, organic acids, phenols, and sugars. Bio-oil produced by pyrolysis may include bio-oil polyols. By reacting bio-oil with itself or with reagent polyols, e.g., glycerol or 2-methyl-1,3-propanediol, intermediate bio-oil polyol products may be formed, and may be further modified by alkoxylation to produce alkoxylated bio-oil polyols. Such bio-oils, bio-oil polyols, intermediate bio-oil polyols, and alkoxylated bio-oil polyols may have added value, for example, as replacement polyol reagents in polymerizations for forming polyesters, polyurethanes, copolymers, phenolic resins, hot melt adhesive compositions, and the like.

In various embodiments, an alkoxylated bio-oil polyol is provided. The alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value (reduced percentage of free hydroxyl groups with respect to molecular weight). The bio-oil polyol may be any bio-oil polyol described herein, for example, an intermediate bio-oil polyol and a polyol bio-oil product.

In several embodiments, the alkoxylated bio-oil polyol may be characterized compared to the bio-oil polyol by the reduced viscosity and the increased molecular weight. The alkoxylated bio-oil polyol may be characterized compared to the bio-oil polyol by: the reduced viscosity; the increased molecular weight; the weight percentage increase; and the reduced hydroxyl value. The alkoxylated bio-oil polyol may be characterized compared to the bio-oil polyol by: the reduced viscosity; the increased molecular weight; the lower gel permeation chromatography retention time; the weight percentage increase; and the reduced hydroxyl value.

In some embodiments, the alkoxylated bio-oil polyol may be characterized compared to the bio-oil polyol by the reduced viscosity. The reduced viscosity may be a percentage of a viscosity of the bio-oil of between greater than about 1% and less than one of: 100%, 99%, 98%, 97%, 96%, 95%, 94%, 93%, 92%, 91%, 90%, 85%, 80%, 75%, 70%, 65%, 60%, 55%, 50%, 45%, 40%, 35%, 30%, 25%, 20%, 15%, 10%, and 5%; or between any range between or between about any two of the preceding values, for example, between about 1% and less than 100%.

In various embodiments, the alkoxylated bio-oil polyol may be characterized compared to the bio-oil polyol by the increased molecular weight. The increased molecular weight may be a percentage of a molecular weight of the bio-oil of at least about one of: 101%, 102%, 103%, 104%, 105%, 106%, 107%, 108%, 109%, 110%, 115%, 120%, 125%, 130%, 135%, 140%, 145%, 150%, 155%, 160%, 165%, 170%, 175%, 180%, 185%, 190%, 195%, and 200%, or a range between any two of the preceding values, for example, between greater than 100% and less than about 200%.

In several embodiments, the alkoxylated bio-oil polyol may be characterized compared to the bio-oil polyol by the weight percentage increase. The weight percentage increase may be a percentage over a weight of the bio-oil of at least about one of: 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, and 100%, or a range between any two of the preceding values, for example, between about 1% and about 100%.

In some embodiments, the alkoxylated bio-oil polyol may be characterized compared to the bio-oil polyol by the reduced hydroxyl value, the reduced percentage of free hydroxyl groups compared to a number of free hydroxyl groups in the bio-oil polyol. The reduced percentage of free hydroxyl groups may be at least about one of: 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, and 99%, or less than 100%, or a range between any two of the preceding values, for example, between about 1% and less than 100% of a number of free hydroxyl groups in the bio-oil polyol.

FIG. 1 is a flow diagram of an example method 100 for preparing an alkoxylated bio-oil polyol. Method 100 may include providing a bio-oil polyol (step 102). The method may also include reacting the bio-oil polyol with a cyclic alkylene oxide, such as an epoxide, in the presence of a catalyst, e.g., an alkoxylation catalyst, under reaction conditions effective to form the alkoxylated bio-oil polyol (step 104). The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value.

In some embodiments, the cyclic alkylene oxide may include unsubstituted ethylene oxide or substituted ethylene oxide. The substituted ethylene oxide may be substituted with a linear or branched $C_1$-$C_6$ alkyl group or a $C_3$-$C_6$ cycloalkyl group. For example, the cyclic alkylene oxide may include 1,2-propylene oxide. The cyclic alkylene oxide may be present in a weight % compared to a weight of the bio-oil polyol of about 5%, 10%, 15%, 20%, 25%, 30%, 35%, 40%, 45%, 50%, 55%, 60%, 65%, or 70%, or in a range between about any of the preceding weight % values, for example, between about 5 weight % and about 70 weight %. In some embodiments, the cyclic alkylene oxide may be present in a weight % compared to a weight of the bio-oil polyol of greater than 10 weight %.

In several embodiments, the reaction conditions may include the presence of a catalytic alkali metal hydroxide or a catalytic alkali earth metal hydroxide or oxide. An alkali metal hydroxide may include a hydroxide of Li, Na, K, Rb, or Cs. For example, the reaction conditions may include the presence of a catalytic amount of potassium hydroxide. An alkali earth metal hydroxide or oxide may include a hydroxide or oxide of Be, Mg, Ca, Sr, Ba, and the like. For example, an alkali earth metal hydroxide may include magnesium hydroxide, and an alkali earth metal oxide may include calcium oxide.

In various embodiments, the reaction conditions may include the presence of an acidified lignin. The reaction conditions may include the presence of a catalyst in a weight % compared to a weight of the bio-oil polyol. The weight % of the catalyst may be between about 0.01 weight % and about 10 weight %, for example, a weight % of about 0.01, 0.05, 0.1, 0.15, 0.2, 0.25, 0.3, 0.4, 0.5, 0.6, 0.7, 0.75, 0.8, 0.9, 1, 1.25, 1.5, 1.75, 2.5, 3, 3.5, 4, 4.5, 5, 6, 7, 8, 9, and 10, or any range of weight % between any two of the preceding weight % values, for example, between about 0.01 weight % and about 5 weight %.

In some embodiments, the reaction conditions may include a temperature between about 80° C. and about 180° C. For example, the temperature in ° C. may be 80, 85, 90, 95, 100, 105, 110, 115, 120, 125, 130, 135, 140, 145, 150, 155, 160, 165, 170, 175, and 180, or any range of temperature between any two of the preceding ° C. values.

In several embodiments, the reaction conditions may include a pressure in pounds per square inch (psi) of between about 0 psi and about 600 psi. For example, the pressure in psi may be about 0, 15, 30, 45, 60, 75, 90, 105, 120, 135, 150, 175, 200, 225, 250, 275, 300, 325, 350, 375, 400, 425, 450, 475, 500, 525, 550, 575, and 600, or any range of pressure between any two of the preceding psi values.

In various embodiments, the bio-oil polyol may include a bio-oil, a bio-oil esterified by reaction with itself or a bio-oil esterified by reaction with a reagent polyol. The bio-oil may be produced by pyrolysis of biomass. Additionally or alternatively, the bio-oil may be a catalytic bio-oil produced by catalytic pyrolysis of biomass.

In some embodiments, the method may further include reacting a bio-oil with at least one of itself or a reagent polyol in the presence of a polyol-forming catalyst to provide the bio-oil polyol. For example, the reagent polyol may include one or more of: glycerol, ethylene glycol, propylene glycol (1,2-propane diol), 1,3-propanediol, 2-methyl-1,3-propanediol, pentaerythritol, a sugar alcohol, a polyalkylene glycol, and the like. Sugar alcohols may include, but are not limited to, glycerol, ethylene glycol, propylene glycol (1,2-propane diol), 1,3-propanediol, 2-methyl-1,3-propanediol, pentaerythritol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, and the like. Examples of polyalkylene glycols may include, but are not limited to, a polyethylene glycol, a polypropylene glycol, a poly(tetramethylene ether) glycol, and the like. The reagent polyol may include amine alcohols such as triethanolamine. The reagent polyol may include one or more of acidified and demethylated crude glycerol and wet crude glycerol from steam splitting.

In several embodiments, the polyol-forming catalyst may contribute to reacting the bio-oil in the reaction mixture to form the bio-oil polyol product. Suitable catalysts may be based on metallic compounds of mercury, lead, tin, bismuth, zinc, and the like. Such metallic compounds may include one or more different oxidation states (I), (II), (III), or (IV), for example, tin(II) and tin(IV) compounds. Such metallic compounds of mercury, lead, tin, bismuth, zinc, and the like, may include metallic carboxylates, oxides, mercaptides, and the like. For example, mercury carboxylates, bismuth carboxylates, zinc carboxylates, tin carboxylates and the like may be suitable catalysts. For example, metal carboxylate compounds may include one or more carboxylates. Such one or more carboxylates may include monocarboxylates, or two or more carboxylates in the same organic carboxylate, such as the dicarboxylate oxalate in tin (II) oxalate. Metal carboxylate compounds may also include alkyl carboxylates with one or more pendant alkyl groups, e.g., dialkyl tin dicarboxylates such as dibutyltin dilaurate. For example, the method may include providing a tin (II) oxalate polyol-forming catalyst. The tin (II) oxalate catalyst may contribute to reacting the bio-oil in the reaction mixture to form the bio-oil polyol.

In some embodiments, reacting a bio-oil with at least one of itself or a reagent polyol in the presence of a polyol-forming catalyst to provide the bio-oil polyol may be conducted according to any of the subject matter herein regarding preparing or reacting bio-oil.

In various embodiments, the method may further include contacting an acidified lignin to one or more of: the bio-oil, the reagent polyol, and the polyol-forming catalyst. The method may also include pyrolyzing biomass to provide the bio-oil or catalytically pyrolyzing biomass to provide the bio-oil as a catalytic bio-oil.

Figure 2:
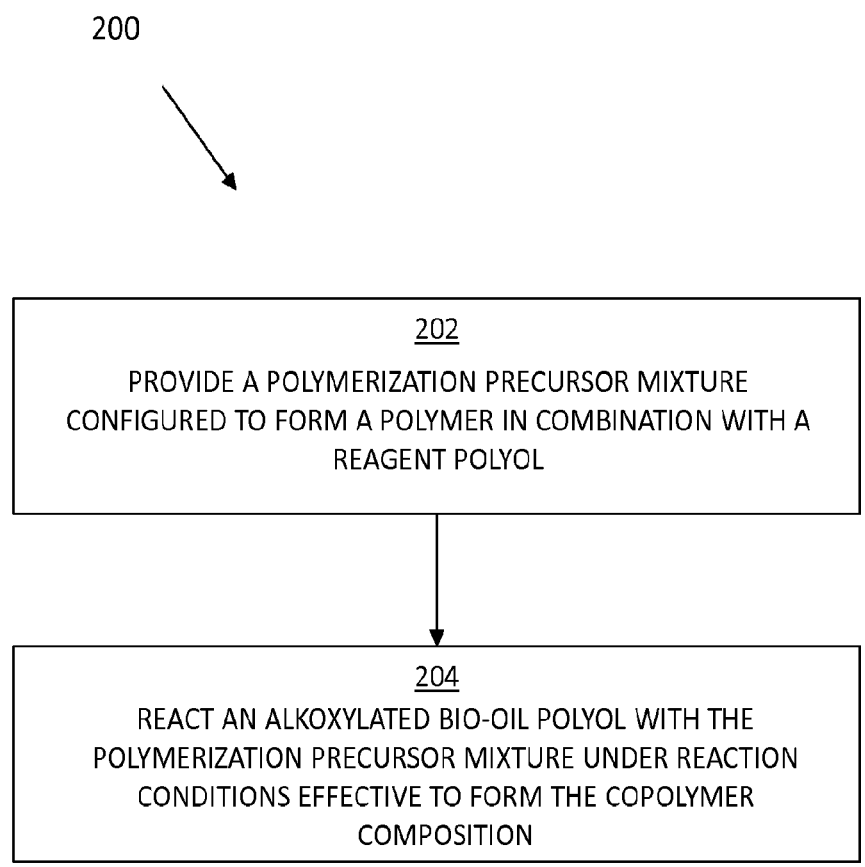
FIG. 2 is a flow diagram of an example method 200 for producing a copolymer composition using an alkoxylated bio-oil polyol.

FIG. 2 is a flow diagram of an example method 200 for producing a copolymer composition. Method 200 may include providing a polymerization precursor mixture configured to form a polymer in combination with a reagent polyol (step 202). The method may also include reacting an alkoxylated bio-oil polyol with the polymerization precursor mixture under reaction conditions effective to form the copolymer composition (step 204). The alkoxylated bio-oil polyol may be formed according to any subject matter described herein regarding the alkoxylated bio-oil polyol or forming the alkoxylated bio-oil polyol. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value.

The method for producing the copolymer composition may include forming the alkoxylated bio-oil polyol according to any subject matter described herein regarding the alkoxylated bio-oil polyol or forming the alkoxylated bio-oil polyol.

In various embodiments, the polymerization precursor mixture may include a phenolic resin precursor and a phenolic resin catalyst as described herein. The polymerization precursor mixture may be effective in reacting with the alkoxylated bio-oil polyol to produce the copolymer composition as a phenolic resin.

In several embodiments, the method for producing the copolymer composition may include contacting a viscosity-reducing modifier to the alkoxylated bio-oil polyol and/or the polymerization precursor mixture.

In various embodiments, the polymerization precursor mixture may include a polyurethane precursor. The polyurethane precursor may be effective to form the copolymer composition including a copolymer of a polyurethane and the alkoxylated bio-oil polyol. For example, the polyurethane precursor may include one or more of: toluene diisocyanate, methylene diphenyl diisocyanate, 1,6-hexamethylene diisocyanate, 1-isocyanato-3-isocyanatomethyl-3,5,5-trimethyl-cyclohexane, 4,4'-diisocyanato dicyclohexylmethane, and the like.

In some embodiments, the polymerization precursor mixture may include water. The polymerization precursor mixture may include a petroleum polyol. The polymerization precursor mixture may include the petroleum polyol in a weight % compared to the alkoxylated bio-oil polyol of between about 5 weight % and about 95 weight %, for example, a weight % of about 5, 10, 15, 20, 25, 30, 35, 40, 45, 50, 55, 60, 65, 70, 75, 80, 85, 90, and 95, or any range of weight % between any two of the preceding weight % values. For example, the petroleum polyol in a weight % compared to the alkoxylated bio-oil polyol of between 10 weight % and about 95 weight %.

In several embodiments, the polymerization precursor mixture may include a surfactant configured to support polyurethane foam formation. The surfactant may include, for example, a silicone surfactants. Suitable silicone surfactants are commercially available, for example, the DABCO® series of silicone surfactants (Air Products and Chemicals, Inc., Allentown, Pa.), including, for example, one or more of: SI3102, DC198, DC193, DC2525, DC2584, DC2585, DC3042, DC3043, DC5000, DC5043, and the like, e.g., DABCO® DC193.

In various embodiments, the reaction conditions may include the presence of a catalyst. For example, the catalyst may be a polyurethane polymerization catalyst for reacting the alkoxylated bio-oil polyol with one or more polyurethane precursors as described herein to form the copolymer composition. Suitable polyurethane catalysts may include, but are not limited to, amine compounds, hypophosphite salts, zeolites, metal complexes such as stannous or stannic salts, and combinations thereof. Suitable amine catalysts may include, but are not limited to, tertiary amines such as triethylenediamine, dimethylcyclohexylamine, dimethylethanolamine, and the like. Hypophosphite salts include, for example, alkali metal salts such as sodium hypophosphite and alkali earth metal salts such as calcium hypophosphite, and the like. Catalysts for polyurethane polymerization may be based on metallic compounds of mercury, lead, tin, bismuth, zinc, and the like. Such metallic compounds may include one or more different oxidation states (I), (II), (III), or (IV), for example, tin(II) and tin(IV) compounds. Such metallic compounds of mercury, lead, tin, bismuth, zinc, and the like, may include metallic carboxylates, oxides, mercaptides, and the like. For example, mercury carboxylates, bismuth carboxylates, zinc carboxylates, tin carboxylates and the like may be suitable catalysts. For example, metal carboxylate compounds may include one or more carboxylates. Such one or more carboxylates may include monocarboxylates, or two or more carboxylates in the same organic carboxylate, such as the dicarboxylate oxalate in tin (II) oxalate. Metal carboxylate compounds may also include alkyl carboxylates with one or more pendant alkyl groups, e.g., dialkyl tin dicarboxylates such as dibutyltin dilaurate. For example, the method may include providing a tin (II) oxalate as a catalyst. For example, the polymerization precursor mixture may include a polyamino alkane configured to catalyze polyurethane formation. The polymerization precursor mixture may include a polyalkylamino alkyl ether configured to catalyze polyurethane formation. The polymerization precursor mixture may include an amino alcohol configured to catalyze polyurethane formation.

In various embodiments, the polymerization precursor mixture may include a bio-based polyester polyol. Suitable bio-based polyester polyols may include, but may be not limited to, bio-based polyester polyols, such as Priplast bio-based polyester polyols (Croda USA, New Castle, Del.).

In some embodiments, the polymerization precursor mixture may include one or more of: a petroleum polyol, water, a silicone foam forming surfactant, a trialkylamine in an alkylene glycol, a polyalkylamino alkyl ether in an alkylene glycol, an antioxidant, a flame retardant, an ultraviolet light stabilizer, a pigment, a dye, a plasticizer, and the like.

The polymerization precursor mixture may include an amine. The amine may include a tertiary amine. The amine may include a trialkylamine. For example, the amine may include one or more of: DABCO® BDMA, DABCO® MP601, DABCO® RP202, DABCO® 1027, DABCO® 1028, DABCO® 2033, DABCO® 2039, DABCO® 2040, DABCO® 33-LV, DABCO® 33-LX, DABCO® 8154, DABCO® B-16, and the like (Air Products and Chemicals, Inc., Allentown, Pa.). The amine may include a polylalkylamino alkyl ether, for example, DABCO® BL-19 (Air Products and Chemicals, Inc., Allentown, Pa.).

In several embodiments, the polymerization precursor mixture may include a polyfunctional ester precursor effective to form the copolymer composition, which may include a copolymer of a polyester and the alkoxylated bio-oil polyol. The polyfunctional ester precursor may include one or more of: a polycarboxylic acid, a polyacyl halide, or a cyclic anhydride. Examples of suitable polyfunctional ester monomers may include, but are not limited to: diacids such as glutaric, adipic, pimelic, suberic, azelaic, sebacic, dodecanedioic, and tetradecanedioic acids, and the like; diacyl halides of diacids, such as adipoyl chloride, and the like; or cyclic anhydrides of diacids, such as adipic anhydride; and the like.

In various embodiments, the reaction conditions may include the presence of a catalyst. For example the catalyst may be a polyester polymerization catalyst. The polyester polymerization catalyst may contribute to reacting the alkoxylated bio-oil polyol with the polyfunctional ester precursor to form the copolymer composition. Suitable polyester catalysts may include, for example, antimony trioxide, antimony triacetate, alkali hydroxides such as potassium hydroxide, oligomeric aluminoxane, and the like. Further crosslinking may be obtained with organic peroxide catalysts such as methyl ethyl ketone peroxide, benzoyl peroxide, and the like. Catalysts for polyester polymerization may be based on metallic compounds of mercury, lead, tin, bismuth, zinc, and the like. Such metallic compounds may include one or more different oxidation states (I), (II), (III), or (IV), for example, tin(II) and tin(IV) compounds. Such metallic compounds of mercury, lead, tin, bismuth, zinc, and the like, may include metallic carboxylates, oxides, mercaptides, and the like. For example, mercury carboxylates, bismuth carboxylates, zinc carboxylates, tin carboxylates and the like may be suitable catalysts. For example, metal carboxylate compounds may include one or more carboxylates. Such one or more carboxylates may include monocarboxylates, or two or more carboxylates in the same organic carboxylate, such as the dicarboxylate oxalate in tin (II) oxalate. Metal carboxylate compounds may also include alkyl carboxylates with one or more pendant alkyl groups, e.g., dialkyl tin dicarboxylates such as dibutyltin dilaurate. For example, the method may include providing a tin (II) oxalate as a catalyst.

In several embodiments, the polymerization precursor mixture may include a phenolic resin precursor, effective to form the copolymer composition, which may include a copolymer of a phenolic resin and the alkoxylated bio-oil polyol. The phenolic resin precursor may include a phenol compound substituted at an aryl carbon with a 1-hydroxyalkyl group to form a benzylic alcohol. For example, the phenolic resin precursor may include ortho-hydroxymethyl phenol. The phenolic resin precursor may include a phenol compound and one or more of an aldehyde and a ketone. The phenol compound and the one or more of the aldehyde and the ketone may react in situ to produce the phenol compound substituted at an aryl carbon with a 1-hydroxyalkyl group. The aldehyde may include one or more of: formaldehyde, acetaldehyde, propionaldehyde, butyraldehyde, valeraldehyde, glutaraldehyde, glyoxal, benzaldehyde, propane-1,3-dial, butane-1,4-dial, and the like. The ketone may include one or more of: acetone, 2-butanone, 2-pentanone, 3-pentanone, butane-2,3-dione, pentane-2,4-dione, and the like. The copolymer composition formed may include a phenol-formaldehyde resin.

In several embodiments, the phenolic resin precursor may include a phenol compound substituted at an aryl carbon with a methylene-urea-hydroxyalkyl, e.g., hydroxymethyl group. The phenolic resin precursor may include a phenol compound, a urea or a substituted urea, and one or more of an aldehyde and a ketone. The phenol compound and the one or more of the aldehyde and the ketone may react in situ to produce the phenol compound substituted at an aryl carbon with a methylene-urea-hydroxyalkyl, e.g., hydroxymethyl group. The aldehyde may include one or more of: formaldehyde, acetaldehyde, propionaldehyde, butyraldehyde, valeraldehyde, glutaraldehyde glyoxal, benzaldehyde, propane-1,3-dial, butane-1,4-dial, and the like. The ketone may include one or more of: acetone, 2-butanone, 2-pentanone, 3-pentanone, butane-2,3-dione, pentane-2,4-dione, and the like. The substituted urea may include $C_1$-$C_8$ alkyl N—N'-substitution, for example, with methyl groups. The copolymer composition formed may include a phenol-urea-formaldehyde resin.

In various embodiments, the reaction conditions may include the presence of a catalyst. The reaction conditions may include a temperature in ° C. of about 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, or 225, or any range between the preceding values, for example, between about 0° C. and about 180° C. The reaction conditions may include a pressure in pounds per square inch (psi) of about 60, 75, 90, 105, 120, 135, 150, 175, 200, 225, 250, 275, 300, 325, 350, 375, 400, 425, 450, 475, 500, 525, 550, 575, or 600, or any range between any two of the preceding values, for example, between about 0 psi and about 600 psi.

In some embodiments, the method for producing the copolymer composition may include configuring the copolymer composition as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, an integral skin foam, and the like.

In various embodiments, a copolymer composition is provided. The copolymer composition may include a copolymerized alkoxylated bio-oil polyol. The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value.

The copolymer composition may include at least in part a reaction product of the alkoxylated bio-oil polyol copolymerized with a phenolic resin precursor and a phenolic resin catalyst effective to produce the copolymer composition as a phenolic resin. The phenolic resin precursor may be incorporated as one or more of: a covalently polymerized phenolic monomer, crosslinker, oligomer, polymer, copolymer, and the like.

In some embodiments, the copolymer may at least in part incorporate a polyester copolymerized with the alkoxylated bio-oil polyol. The polyester may be incorporated as one or more of: a covalently polymerized polyester monomer, crosslinker, oligomer, polymer, copolymer, and the like.

In several embodiments, the copolymer may at least in part incorporate a polyurethane copolymerized with the alkoxylated bio-oil polyol. The polyurethane may be incorporated as one or more of: a covalently polymerized polyurethane monomer, crosslinker, oligomer, polymer, copolymer, and the like.

In various embodiments, the copolymer composition may be produced according to any subject matter herein for the method of producing the copolymer composition. The copolymer composition may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, an integral skin foam, and the like.

In various embodiments, a copolymer article is provided. The copolymer article may include a copolymer composition including a copolymerized alkoxylated bio-oil polyol. The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value.

The copolymer composition may be produced according to any subject matter herein for the method of producing the copolymer composition.

Moreover, the copolymer composition may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, an integral skin foam, and the like.

In various embodiments, a method is provided for preparing a bio-oil polyol, for example, the bio-oil polyol employed in the method of preparing an alkoxylated bio-oil polyol. The method for preparing the bio-oil polyol may include providing a bio-oil in a reaction mixture. The reaction mixture may include a plurality of reactive oxygen groups. The bio-oil may include at least a portion of the plurality of reactive oxygen groups. The method may also include reacting the bio-oil in the reaction mixture to form a polyol bio-oil product. The polyol bio-oil product may include a plurality of functional groups that include carbon-oxygen bonds. The carbon-oxygen bonds may be formed by reacting the bio-oil in the reaction mixture. The polyol bio-oil product may include a plurality of free hydroxyl groups.

In various embodiments, the plurality of reactive oxygen groups may include one or more of: free hydroxyls, carboxylic acids, carbonyls, cyclic alkylene oxides, and the like. At least a portion of the plurality of free hydroxyl groups included by the polyol bio-oil product may be derived from a portion of plurality of free hydroxyl groups included by the bio-oil. At least a portion of the plurality of free hydroxyl groups included by the polyol bio-oil product may be formed by reacting the bio-oil in the reaction mixture to transform at least a portion of the plurality of reactive oxygen groups into the at least a portion of the plurality of free hydroxyl groups included by the polyol bio-oil product.

In various embodiments, the method may also include providing one or more of a reagent polyol and a cyclic alkylene oxide to the reaction mixture. At least a portion of the plurality of reactive oxygen groups may be provided by one or more of the reagent polyol and the cyclic alkylene oxide. Reacting the bio-oil in the reaction mixture to form the polyol bio-oil product may include reacting the bio-oil with one or more of the reagent polyol and the cyclic alkylene oxide.

In various embodiments, the method may also include providing a catalyst to the reaction mixture. The catalyst may contribute to reacting the bio-oil in the reaction mixture to form the polyol bio-oil product. Suitable catalysts may be based on metallic compounds of mercury, lead, tin, bismuth, zinc, and the like. Such metallic compounds may include one or more different oxidation states (I), (II), (III), or (IV), for example, tin(II) and tin(IV) compounds. Such metallic compounds of mercury, lead, tin, bismuth, zinc, and the like, may include metallic carboxylates, oxides, mercaptides, and the like. For example, mercury carboxylates, bismuth carboxylates, zinc carboxylates, tin carboxylates and the like may be suitable catalysts. For example, metal carboxylate compounds may include one or more carboxylates. Such one or more carboxylates may include monocarboxylates, or two or more carboxylates in the same organic carboxylate, such as the dicarboxylate oxalate in tin (II) oxalate. Metal carboxylate compounds may also include alkyl carboxylates with one or more pendant alkyl groups, e.g., dialkyl tin dicarboxylates such as dibutyltin dilaurate. For example, the method may include providing a tin (II) oxalate as a catalyst. For example, the method may include providing a tin (II) oxalate catalyst to the reaction mixture. The tin (II) oxalate catalyst may contribute to reacting the bio-oil in the reaction mixture to form the polyol bio-oil product.

In various embodiments, the bio-oil may include at least a portion of the reactive oxygen groups including at least free hydroxyls and free carboxylic acids. Forming the carbon-oxygen bonds may include forming ester bonds between at least a portion of the free hydroxyls and the free carboxylic acids included by the bio-oil.

In various embodiments, the bio-oil may include at least a portion of the reactive oxygen groups including at least free carboxylic acids. The method may also include adding one or more of a reagent polyol and a cyclic alkylene oxide to the reaction mixture. Forming the carbon-oxygen bonds may include forming ester bonds by reacting the free carboxylic acids of the bio-oil with one or more of the reagent polyol and the cyclic alkylene oxide. The added polyol reagent may include one or more of a sugar alcohol, an alcohol amine, a polyalkylene glycol, and the like. Examples of sugar alcohols may include, but are not limited to, glycerol, ethylene glycol, propylene glycol (1,2-propane diol), 1,3-propanediol, 2-methyl-1,3-propanediol, pentaerythritol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, and the like. Examples of polyalkylene glycols may include, but are not limited to, a polyethylene glycol, a polypropylene glycol, or a poly(tetramethylene ether) glycol, and the like. Examples of amine alcohols include triethanol amine and the like.

For example, the added polyol reagent may include one or more of glycerol, ethylene glycol, propylene glycol (1,2-propane diol), 1,3-propanediol, 2-methyl-1,3-propanediol, pentaerythritol, a sugar alcohol, a polyethylene glycol, a polypropylene glycol, a poly(tetramethylene ether) glycol, and the like.

In various embodiments, the added cyclic alkylene oxide may include one or more of ethylene oxide and propylene oxide.

In various embodiments, the method may also include pyrolyzing biomass to provide the bio-oil.

Figure 4:
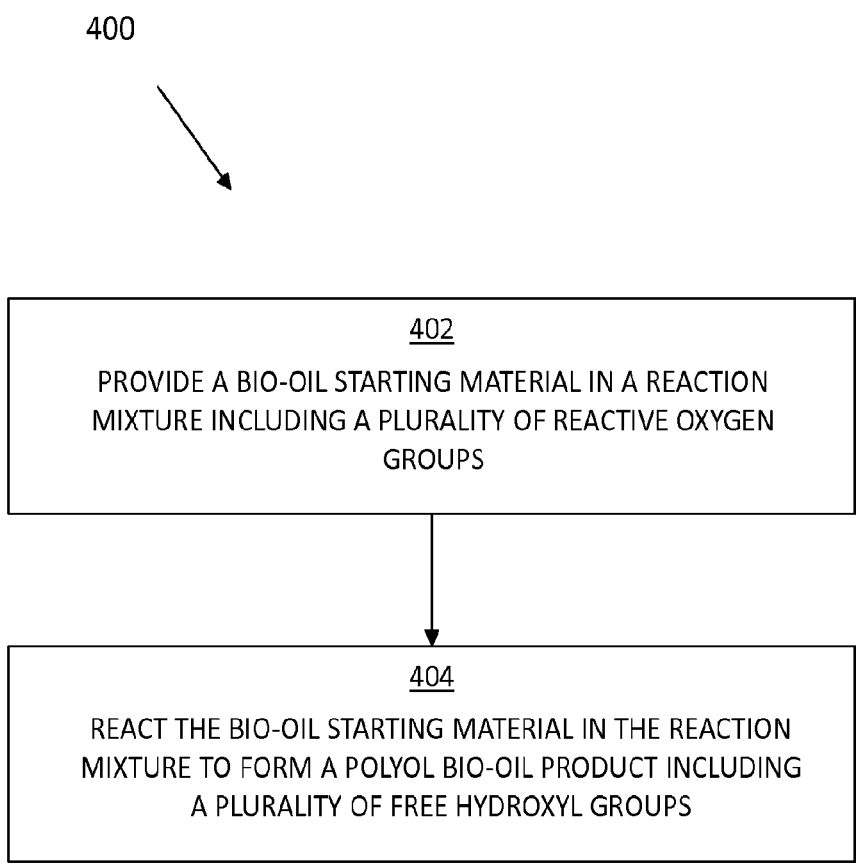
FIG. 4 is a flow diagram of a method of preparing a polyol bio-oil product.

FIG. 4 is a flow diagram of a method 400 of preparing a polyol bio-oil product, according to various embodiments. The method 400 may include 402 providing a bio-oil starting material in a reaction mixture. The reaction mixture may include a plurality of reactive oxygen groups. The bio-oil starting material may include at least a portion of the plurality of reactive oxygen groups. The method may also include 404 reacting the bio-oil starting material in the reaction mixture to form a polyol bio-oil product. The polyol bio-oil product may include a plurality of functional groups that include carbon-oxygen bonds. The carbon-oxygen bonds may be formed by reacting the bio-oil starting material in the reaction mixture. The polyol bio-oil product may include a plurality of free hydroxyl groups.

Figure 5:
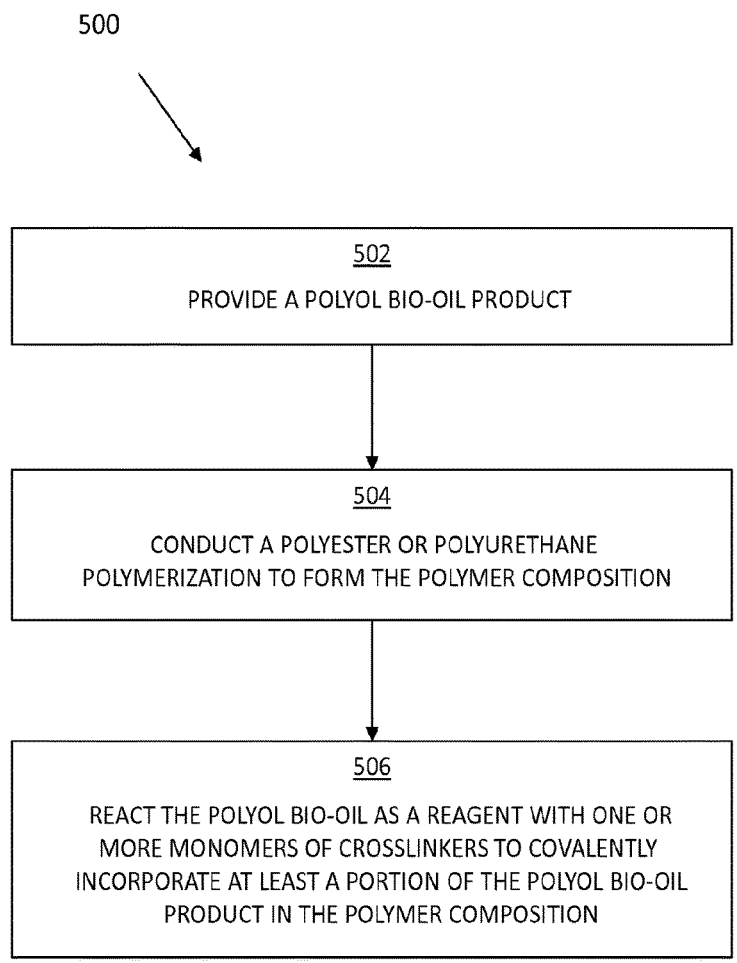
FIG. 5 is a flow diagram of method for producing a polymer composition using a polyol bio-oil product.

FIG. 5 is a flow diagram of a method 500 for producing a polymer composition using a polyol bio-oil product, according to various embodiments. The method 500 for producing a polymer composition may include 502 providing a polyol bio-oil product. The method for producing a polymer composition may include 504 conducting a polyester or polyurethane polymerization to form the polymer composition. The polyester or polyurethane polymerization may include 506 reacting the polyol bio-oil as a reagent with one or more monomers or crosslinkers. The polymer composition may covalently incorporate at least a portion of the polyol bio-oil product. In various embodiments, the polyol bio-oil product may be provided according to any of the subject matter described herein.

In various embodiments, a method for preparing an alkoxylated bio-oil polyol is provided. The method may include providing a bio-oil polyol. The method may also include reacting the bio-oil polyol with a cyclic alkylene oxide. The bio-oil polyol may be reacted with the cyclic alkylene oxide in the presence of a catalyst. The bio-oil polyol may be reacted with the cyclic alkylene oxide under reaction conditions effective to form the alkoxylated bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value.

In some embodiments, the cyclic alkylene oxide may include unsubstituted ethylene oxide. The cyclic alkylene oxide may include ethylene oxide substituted with a linear $C_1$-$C_6$ alkyl group. The cyclic alkylene oxide may include ethylene oxide substituted with a branched $C_1$-$C_6$ alkyl group. The cyclic alkylene oxide may include ethylene oxide substituted with a $C_3$-$C_6$ cycloalkyl group. The cyclic alkylene oxide may include 1,2-propylene oxide. The cyclic alkylene oxide may be present in a weight % compared to a weight of the bio-oil polyol of greater than 10 weight %. The cyclic alkylene oxide may be present in a weight % compared to a weight of the bio-oil polyol of between about 5 weight % and about 70 weight %.

In several embodiments, the reaction conditions may include presence of a catalytic alkali metal hydroxide. The reaction conditions may include presence of a catalytic alkali earth metal hydroxide. The reaction conditions may include presence of a catalytic alkali earth metal oxide. The reaction conditions may include presence of a catalytic amount of potassium hydroxide. The reaction conditions may include presence of an acidified lignin. The reaction conditions may include presence of a catalyst in a weight % compared to a weight of the bio-oil polyol of between about 0.01 weight % and about 5 weight %. The reaction conditions may include a temperature between about 80° C. and about 180° C. The reaction conditions may include a pressure in pounds per square inch of between about 0 and about 600.

In various embodiments, the bio-oil and the bio-oil polyol may be provided together, e.g., the bio-oil polyol may include the bio-oil or the bio-oil may include the bio-oil polyol. The bio-oil polyol may include an intermediate bio-oil polyol derived from the bio-oil modified by reaction with the bio-oil itself. The bio-oil polyol may include the intermediate bio-oil polyol derived from the bio-oil modified by reaction with a reagent polyol. The bio-oil polyol may include one or more of: the bio-oil, the intermediate bio-oil polyol derived from the bio-oil modified by reaction with the bio-oil, and the intermediate bio-oil polyol derived from the bio-oil modified by reaction with the reagent polyol.

In some embodiments, the bio-oil may be or may include a pyrolytic bio-oil produced by pyrolysis of biomass. The bio-oil may be or may include a catalytic bio-oil produced by catalytic pyrolysis of biomass. The method may include pyrolyzing biomass to provide the bio-oil. The method may include catalytically pyrolyzing biomass to provide the bio-oil as a catalytic bio-oil. The method may include reacting a bio-oil with the bio-oil to provide the bio-oil polyol. The method may include reacting the bio-oil with the reagent polyol to provide the bio-oil polyol. The method may include reacting the bio-oil with at least one of the bio-oil or a reagent polyol. The method may include reacting the bio-oil with at least one of the bio-oil or a reagent polyol in the presence of a polyol-forming catalyst to provide the bio-oil polyol. The polyol-forming catalyst may include tin.

In several embodiments, the reagent polyol may include one or more of: glycerol, ethylene glycol, propylene glycol (1,2-propane diol), 1,3-propanediol, 2-methyl-1,3-propanediol, pentaerythritol, a sugar alcohol, an alcohol amine, a polyalkylene glycol, acidified and/or demethylated crude glycerol, wet crude glycerol from steam splitting, and the like. The reagent polyol may include glycerol. The reagent polyol may include ethylene glycol. The reagent polyol may include 1,3-propanediol. The reagent polyol may include 2-methyl-1,3-propanediol. The reagent polyol may include pentaerythritol. The reagent polyol may include a sugar alcohol. The reagent polyol may include an alcohol amine. The reagent polyol may include a polyalkylene glycol. The reagent polyol may include acidified crude glycerol. The reagent polyol may include demethylated crude glycerol. The reagent polyol may include acidified and demethylated crude glycerol. The reagent polyol may include wet crude glycerol from steam splitting.

In some embodiments, the method may include contacting an acidified lignin to one or more of: the bio-oil, the reagent polyol, and the polyol-forming catalyst. The method may include contacting the acidified lignin to the bio-oil. The method may include contacting the acidified lignin to the reagent polyol. The method may include contacting the acidified lignin to the polyol-forming catalyst.

In various embodiments, a method for producing a copolymer composition is provided. The method may include providing a polymerization precursor mixture configured to form a polymer in combination with a reagent polyol, e.g., an alkoxylated bio-oil polyol. The method may also include reacting the alkoxylated bio-oil polyol with the polymerization precursor mixture. The method may be conducted under reaction conditions effective to form the copolymer composition. The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; and a reduced hydroxyl value. The method for producing a copolymer composition may include forming the alkoxylated bio-oil polyol according to any method described herein.

In some embodiments, the method may include contacting a viscosity-reducing modifier to the alkoxylated bio-oil polyol and/or the polymerization precursor mixture. The method may include contacting the viscosity-reducing modifier to the alkoxylated bio-oil polyol. The method may include contacting the viscosity-reducing modifier to the polymerization precursor mixture. The viscosity-reducing modifier may be a viscosity-reducing modifier polyol. The viscosity-reducing modifier polyol may include a petroleum-derived polyol, a polyester polyol, a bio-based polyester polyol, and the like. Suitable bio-based polyester polyols may include, but may be not limited to, bio-based polyester polyols, such as Priplast bio-based polyester polyols (Croda USA, New Castle, Del.). The viscosity-reducing modifier polyol may include a diol, a glycol, a triol, a tetraol, and the like. The viscosity-reducing modifier polyol may include one or more of: ethylene glycol, propylene glycol, neopentyl glycol, 2-methyl-1,3-propane diol, glycerol, trimethylolpropane, hexanetriol, butanetriol, trimethylolethane, pentaerythritol, mannitol, sorbitol, methylglucoside, diethylene glycol, polybutylene glycol, and the like.

In several embodiments, the polymerization precursor mixture may include a polyurethane precursor. The polyurethane precursor may be effective to form the copolymer composition including a copolymer of a polyurethane and the alkoxylated bio-oil polyol. The polyurethane precursor may include one or more of: toluene diisocyanate, methylene diphenyl diisocyanate, 1,6-hexamethylene diisocyanate, 1-isocyanato-3-isocyanatomethyl-3,5,5-trimethyl-cyclohexane, 4,4'-diisocyanato dicyclohexylmethane, and the like. The polyurethane precursor may include toluene diisocyanate. The polyurethane precursor may include methylene diphenyl diisocyanate. The polyurethane precursor may include 1,6-hexamethylene diisocyanate. The polyurethane precursor may include 1-isocyanato-3-isocyanatomethyl-3,5,5-trimethyl-cyclohexane. The polyurethane precursor may include 4,4'-diisocyanato dicyclohexylmethane.

In various embodiments, the polymerization precursor mixture may include water. The polymerization precursor mixture may include a petroleum polyol. The polymerization precursor mixture may include the petroleum polyol in a weight % compared to the alkoxylated bio-oil polyol of between about 5 weight % and about 95 weight %. The polymerization precursor mixture may include a surfactant configured to support polyurethane foam formation. The polymerization precursor mixture may include a polyamino alkane configured to catalyze polyurethane formation. The polymerization precursor mixture may include a polyalkylamino alkyl ether configured to catalyze polyurethane formation. The polymerization precursor mixture may include an amino alcohol configured to catalyze polyurethane formation. The polymerization precursor mixture may include a bio-based polyester polyol. The polymerization precursor mixture may include one or more of: a petroleum polyol, water, a silicone foam forming surfactant, a trialkylamine in an alkylene glycol, a polyalkylamino alkyl ether in an alkylene glycol, an antioxidant, a flame retardant, an ultraviolet light stabilizer, a pigment, a dye, a plasticizer, and the like. The polymerization precursor mixture may include the petroleum polyol. The polymerization precursor mixture may include the silicone foam forming surfactant. The polymerization precursor mixture may include the trialkylamine in the alkylene glycol. The polymerization precursor mixture may include the polyalkylamino alkyl ether in the alkylene glycol. The polymerization precursor mixture may include the antioxidant. The polymerization precursor mixture may include the flame retardant. The polymerization precursor mixture may include the ultraviolet light stabilizer. The polymerization precursor mixture may include the pigment. The polymerization precursor mixture may include the dye. The polymerization precursor mixture may include the plasticizer.

In some embodiments, the polymerization precursor mixture may include a polyfunctional ester precursor. The polyfunctional ester precursor may be effective to form the copolymer composition including a copolymer of a polyester and the alkoxylated bio-oil polyol. The polyfunctional ester precursor may include one or more of: a polycarboxylic acid, a polyacyl halide, a cyclic anhydride, and the like. The polyfunctional ester precursor may include the polycarboxylic acid. The polyfunctional ester precursor may include the polyacyl halide. The polyfunctional ester precursor may include the cyclic anhydride.

In several embodiments, the reaction conditions may include presence of a catalyst. The reaction conditions may include a temperature between about 0° C. and about 180° C. The reaction conditions may include a pressure in pounds per square inch of between about 15 and about 600.

In various embodiments, the method may include configuring the copolymer composition as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, an integral skin foam, and the like. The method may include configuring the copolymer composition as the foam. The method may include configuring the copolymer composition as the spray foam. The method may include configuring the copolymer composition as the extrusion. The method may include configuring the copolymer composition as the injection molding. The method may include configuring the copolymer composition as the coating. The method may include configuring the copolymer composition as the adhesive. The method may include configuring the copolymer composition as the elastomer. The method may include configuring the copolymer composition as the foundry resin. The method may include configuring the copolymer composition as the sealant. The method may include configuring the copolymer composition as the casting. The method may include configuring the copolymer composition as the fiber. The method may include configuring the copolymer composition as the potting compound. The method may include configuring the copolymer composition as the reaction injection molded (RIM) plastic. The method may include configuring the copolymer composition as the microcellular elastomer or foam. The method may include configuring the copolymer composition as the integral skin foam.

In some embodiments, the polymerization precursor mixture may include a phenolic resin precursor and a phenolic resin catalyst effective to produce the copolymer composition as a phenolic resin. The phenolic resin precursor may include a phenol compound substituted at an aryl carbon with one or more of: a reactive benzylic alcohol, a benzylic urea, or a benzylic urea substituted with a 1-hydroxyalkyl group, e.g., a hydroxymethyl group. The phenolic resin precursor may include a phenol compound substituted at an aryl carbon with the reactive 1-hydroxyalkyl group, e.g., a hydroxymethyl group. The phenolic resin precursor may include a phenol compound substituted at an aryl carbon with the reactive benzylic urea, e.g., —$CH_2NHC(O)NH_2$. The phenolic resin precursor may include a phenol compound substituted at an aryl carbon with the reactive benzylic urea substituted with a 1-hydroxyalkyl group, e.g., a hydroxymethyl group to form —$CH_2NHC(O)NHCH_2OH$.

The preceding phenolic resin precursors may be prepared in situ. The phenolic resin precursor may include a phenol compound and one or more of formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, pentane-2,4-dione, and the like. The phenolic resin precursor may include formaldehyde. For example, phenol compound may react with formaldehyde to give a phenol compound substituted at an aryl carbon with a 1-hydroxyalkyl group, e.g., a hydroxymethyl group. The aliphatic phenolic resin precursor may include acetaldehyde. For example, a phenol compound may react with acetaldehyde to give a phenol compound substituted at an aryl carbon with a 1-hydroxyalkyl group as —$CR^1R^2OH$ where $R^1$ is H or $C_1$-$C_8$ alkyl and $R^2$ is $C_1$-$C_8$ alkyl, e.g., a hydroxymethyl group when $R^1$ is H and $R^2$ is $CH_3$. The phenolic resin precursor may include propionaldehyde. The phenolic resin precursor may include butyraldehyde. The phenolic resin precursor may include glyoxal. The phenolic resin precursor may include propane-1,3-dial. The phenolic resin precursor may include butane-1,4-dial. The phenolic resin precursor may include glutaraldehyde. The phenolic resin precursor may include acetone. For example, a phenol compound may react with acetone to give a phenol compound substituted at an aryl carbon with a 1-hydroxyalkyl group as —$CR^1R^2OH$, e.g., a hydroxymethyl group when $R^1$ is H and $R^2$ is $CH_3$. The phenolic resin precursor may include 2-butanone. The phenolic resin precursor may include 2-pentanone. The phenolic resin precursor may include 3-pentanone. The phenolic resin precursor may include butane-2,3-dione. The phenolic resin precursor may include pentane-2,4-dione. The phenolic resin precursor may include a reactive carbonyl compound that is at least partly water soluble.

The phenolic resin precursor may be prepared in situ. The phenolic resin precursor may include a phenol compound, a urea or substituted urea, and one or more of: formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, pentane-2,4-dione, and the like. For example, a urea may react with formaldehyde to give a urea-formaldehyde intermediate, e.g., $HOCH_2NHC(O)NH_2$ or $HOCH_2NHC(O)NHCH_2OH$. For example, a urea may react with acetaldehyde to give a urea-aldehyde intermediate, e.g., $HOCR^1R^2NHC(O)NH_2$ or $HOCR^1R^2NHC(O)NHCR^1R^2OH$, where $R^1$ is H or $C_1$-$C_8$ alkyl and $R^2$ is $C_1$-$C_8$ alkyl, e.g., where $R^1$ is H and $R^2$ is $CH_3$. For example, a urea may react with acetone to give a urea-ketone intermediate, e.g. $HOCR^1R^2NHC(O)NH_2$ or $HOCR^1R^2NHC(O)NHCR^1R^2OH$, where $R^1$ is H or $C_1$-$C_8$ alkyl and $R^2$ is $C_1$-$C_8$ alkyl, e.g., where $R^1$ is H and $R^2$ is $CH_3$. The urea-formaldehyde may react with an alkoxylated bio-oil to give a urea-formaldehyde resin incorporating an alkoxylated bio-oil. The urea-formaldehyde may react with the phenol compound to give a phenol-urea-formaldehyde resin. The urea-formaldehyde may react with the phenol compound and the alkoxylated bio-oil to give a phenol-urea-formaldehyde resin incorporating the alkoxylated bio-oil.

In various embodiments, a copolymer composition is provided. The copolymer composition may include a copolymerized alkoxylated bio-oil polyol. The copolymer composition may at least in part incorporate a polyester copolymerized with the alkoxylated bio-oil polyol. The polyester may be incorporated as one or more of a covalently polymerized polyester monomer, crosslinker, oligomer, polymer, or copolymer. The polyester may be incorporated as the covalently polymerized polyester monomer. The polyester may be incorporated as the crosslinker. The polyester may be incorporated as the oligomer. The polyester may be incorporated as the polymer. The polyester may be incorporated as the copolymer. The copolymer may at least in part incorporate a polyurethane copolymerized with the alkoxylated bio-oil polyol. The polyurethane may be incorporated as one or more of a covalently polymerized polyurethane monomer, crosslinker, oligomer, polymer, or copolymer. The polyurethane may be incorporated as the covalently polymerized polyurethane monomer. The polyurethane may be incorporated as the crosslinker. The polyurethane may be incorporated as the oligomer. The polyurethane may be incorporated as the polymer. The polyurethane may be incorporated as the copolymer. The alkoxylated bio-oil polyol may be any alkoxylated bio-oil polyol described herein. For example, the alkoxylated bio-oil polyol may be produced by a process comprising alkoxylation of a bio-oil polyol. The alkoxylated bio-oil polyol may be characterized compared to the bio-oil polyol by one or more of: a reduced viscosity; an increased molecular weight; a lower gel permeation chromatography retention time; a weight percentage increase; or a reduced hydroxyl value. The alkoxylated bio-oil polyol may be produced according to any method described herein. The copolymer composition may be produced according to any method described herein.

In some embodiments, the copolymer composition may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, or an integral skin foam. The copolymer composition may be configured as the foam. The copolymer composition may be configured as the spray foam. The copolymer composition may be configured as the extrusion. The copolymer composition may be configured as the injection molding. The copolymer composition may be configured as the coating. The copolymer composition may be configured as the adhesive. The copolymer composition may be configured as the elastomer. The copolymer composition may be configured as the foundry resin. The copolymer composition may be configured as the sealant. The copolymer composition may be configured as the casting. The copolymer composition may be configured as the fiber. The copolymer composition may be configured as the potting compound. The copolymer composition may be configured as the reaction injection molded (RIM) plastic. The copolymer composition may be configured as the microcellular elastomer or foam. The copolymer composition may be configured as the integral skin foam.

In several embodiments, the copolymer composition may at least in part include a reaction product of the alkoxylated bio-oil polyol copolymerized with a phenolic resin precursor and a phenolic resin catalyst effective to produce the copolymer composition as a phenolic resin. The phenolic resin may include one or more of: a phenol-formaldehyde resin, a phenol-urea-formaldehyde resin, a urea-formaldehyde resin, and the like. For example, the phenol-formaldehyde resin may encompass a phenol-aldehyde resin or a phenol-ketone resin. The phenol-urea-formaldehyde resin may encompass a phenol-urea-aldehyde resin or a phenol-urea-ketone resin. The urea-formaldehyde resin may encompass a urea-aldehyde resin or a urea-ketone resin. The phenolic resin precursor may include a phenol compound substituted at an aryl carbon with one or more of a reactive 1-hydroxyalkyl group, a benzylic urea, or a benzylic urea substituted with a 1-hydroxyalkyl group. The phenolic resin precursor may include a phenol compound substituted at an aryl carbon with a 1-hydroxyalkyl group. The phenolic resin precursor may include a phenol compound substituted at an aryl carbon with the reactive benzylic urea, e.g., —CH$_2$NHC(O)NH$_2$. The phenolic resin precursor may include a phenol compound substituted at an aryl carbon with the reactive benzylic urea substituted with a 1-hydroxyalkyl group, e.g., hydroxymethyl group as —CH$_2$NHC(O)NHCH$_2$OH.

The preceding phenolic resin precursors may be prepared in situ. The phenolic resin precursor may include a phenol compound and one or more of formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, and pentane-2,4-dione. The phenolic resin precursor may include formaldehyde. For example, phenol compound may react with formaldehyde to give a phenol compound substituted at an aryl carbon with a 1-hydroxyalkyl group, e.g., —CH$_2$OH, to form a benzylic alcohol. The aliphatic phenolic resin precursor may include acetaldehyde. For example, a phenol compound may react with acetaldehyde to give a phenol compound substituted at an aryl carbon with a 1-hydroxyalkyl group as —CR$^1$R$^2$OH, e.g., wherein R$^1$ is H and R$^2$ is CH$_3$. The phenolic resin precursor may include propionaldehyde. The phenolic resin precursor may include butyraldehyde. The phenolic resin precursor may include glyoxal. The phenolic resin precursor may include propane-1,3-dial. The phenolic resin precursor may include butane-1,4-dial. The phenolic resin precursor may include glutaraldehyde. The phenolic resin precursor may include acetone. For example, a phenol compound may react with acetone to give a phenol compound substituted at an aryl carbon with 1-hydroxyalkyl group as —CR$^1$R$^2$OH, e.g., wherein R$^1$ is H and R$^2$ is CH$_3$. The phenolic resin precursor may include 2-butanone. The phenolic resin precursor may include 2-pentanone. The phenolic resin precursor may include 3-pentanone. The phenolic resin precursor may include butane-2,3-dione. The phenolic resin precursor may include pentane-2,4-dione. The phenolic resin precursor may include a reactive carbonyl compound that is at least partly water soluble.

The preceding phenolic resin precursors may be prepared in situ. The phenolic resin precursor may include a phenol compound, a urea or substituted urea, and one or more of: formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, and pentane-2,4-dione. For example, a urea may react with formaldehyde to give a urea-formaldehyde intermediate (HOCH$_2$NHC(O)NH$_2$ or HOCH$_2$NHC(O)NHCH$_2$OH). For example, a urea may react with acetaldehyde to give a urea-aldehyde intermediate, e.g., HOCR$^1$R$^2$NHC(O)NH$_2$ or HOCR$^1$R$^2$NHC(O)NHCR$^1$R$^2$OH, e.g., wherein R$^1$ is H and R$^2$ is CH$_3$. For example, a urea may react with acetone to give a urea-ketone intermediate, e.g., HOCR$^1$R$^2$NHC(O)NH$_2$ or HOCR$^1$R$^2$NHC(O)NHCR$^1$R$^2$OH, e.g., wherein R$^1$ and R$^2$ is CH$_3$. The urea-formaldehyde may react with an alkoxylated bio-oil to give a urea-formaldehyde resin incorporating an alkoxylated bio-oil. The urea-formaldehyde may react with the phenol compound to give a phenol-urea-formaldehyde resin. The urea-formaldehyde may react with the phenol compound and the alkoxylated bio-oil to give a phenol-urea-formaldehyde resin incorporating the alkoxylated bio-oil.

In various embodiments, a copolymer article is provided. The copolymer article may include a copolymer composition including a copolymerized alkoxylated bio-oil polyol. The copolymer composition may be any copolymer composition described herein. The copolymer composition may be produced according to any method described herein. In some embodiments, the copolymer composition may be configured as one or more of: a foam, a spray foam, an extrusion, an injection molding, a coating, an adhesive, an elastomer, a foundry resin, a sealant, a casting, a fiber, a potting compound, a reaction injection molded (RIM) plastic, a microcellular elastomer or foam, or an integral skin foam. The copolymer composition may be configured as the foam. The copolymer composition may be configured as the spray foam. The copolymer composition may be configured as the extrusion. The copolymer composition may be configured as the injection molding. The copolymer composition may be configured as the coating. The copolymer composition may be configured as the adhesive. The copolymer composition may be configured as the elastomer. The copolymer composition may be configured as the foundry resin. The copolymer composition may be configured as the sealant. The copolymer composition may be configured as the casting. The copolymer composition may be configured as the fiber. The copolymer composition may be configured as the potting compound. The copolymer composition may be configured as the reaction injection molded (RIM) plastic. The copolymer composition may be configured as the microcellular elastomer or foam. The copolymer composition may be configured as the integral skin foam.

In several embodiments, the copolymer composition of the copolymer article may at least in part include a reaction product of the alkoxylated bio-oil polyol copolymerized with a phenolic resin precursor and a phenolic resin catalyst effective to produce the copolymer composition as a phenolic resin. The phenolic resin may include one or more of: a phenol-formaldehyde resin, a phenol-urea-formaldehyde resin, and a urea-formaldehyde resin. The phenol-formaldehyde resin may encompass a phenol-aldehyde resin or a phenol-ketone resin. The phenol-urea-formaldehyde resin may encompass a phenol-urea-aldehyde resin or a phenol-urea-ketone resin. The urea-formaldehyde resin may encompass a urea-aldehyde resin or a urea-ketone resin. The phenolic resin precursor may include a phenol compound substituted at an aryl carbon with one or more of a reactive benzylic alcohol, a benzylic urea, or a benzylic urea substituted with a hydroxymethyl group. The phenolic resin precursor may include a phenol compound substituted at an aryl carbon with the reactive benzylic alcohol (—$CH_2OH$). The phenolic resin precursor may include a phenol compound substituted at an aryl carbon with the reactive benzylic urea(—$CH_2NHC(O)NH_2$). The phenolic resin precursor may include a phenol compound substituted at an aryl carbon with the reactive benzylic urea substituted with a hydroxymethyl group (—$CH_2NHC(O)NHCH_2OH$).

The preceding phenolic resin precursors may be prepared in situ. The phenolic resin precursor may include a phenol compound and one or more of formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, and pentane-2,4-dione. The phenolic resin precursor may include formaldehyde. For example, phenol compound may react with formaldehyde to give a phenol compound substituted at an aryl carbon with a 1-hydroxyalkyl group, e.g. hydroxymethyl. The aliphatic phenolic resin precursor may include acetaldehyde. For example, a phenol compound may react with acetaldehyde to give a phenol compound substituted at an aryl carbon with a 1-hydroxyalkyl group, e.g. hydroxymethyl. The phenolic resin precursor may include propionaldehyde. The phenolic resin precursor may include butyraldehyde. The phenolic resin precursor may include glyoxal. The phenolic resin precursor may include propane-1,3-dial. The phenolic resin precursor may include butane-1,4-dial. The phenolic resin precursor may include glutaraldehyde. The phenolic resin precursor may include acetone. For example, a phenol compound may react with acetone to give a phenol compound substituted at an aryl carbon with a 1-hydroxyalkyl group, e.g. hydroxymethyl. The phenolic resin precursor may include 2-butanone. The phenolic resin precursor may include 2-pentanone. The phenolic resin precursor may include 3-pentanone. The phenolic resin precursor may include butane-2,3-dione. The phenolic resin precursor may include pentane-2,4-dione. The phenolic resin precursor may include a reactive carbonyl compound that is at least partly water soluble.

The preceding phenolic resin precursors may be prepared in situ. The phenolic resin precursor may include a phenol compound, a urea or substituted urea, and one or more of: formaldehyde, acetaldehyde, propionaldehyde, butyraldehyde, glyoxal, propane-1,3-dial, butane-1,4-dial, glutaraldehyde, acetone, 2-butanone, 2-pentanone, 3-pentanone, butane-2,3-dione, and pentane-2,4-dione. For example, a urea may react with formaldehyde to give a urea-formaldehyde intermediate (HOCH$_2$NHC(O)NH$_2$ or HOCH$_2$NHC(O)NHCH$_2$OH). For example, a urea may react with acetaldehyde to give a urea-aldehyde intermediate, e.g., HOCR$^1$R$^2$NHC(O)NH$_2$ or HOCR$^1$R$^2$NHC(O)NHCR$^1$R$^2$OH, e.g., wherein R$^1$ is H and R$^2$ is CH$_3$. For example, a urea may react with acetone to give a urea-ketone intermediate, e.g., HOCR$^1$R$^2$NHC(O)NH$_2$ or HOCR$^1$R$^2$NHC(O)NHCR$^1$R$^2$OH, e.g., wherein R$^1$ and R$^2$ is CH$_3$. The urea-formaldehyde may react with an alkoxylated bio-oil to give a urea-formaldehyde resin incorporating an alkoxylated bio-oil. The urea-formaldehyde may react with the phenol compound to give a phenol-urea-formaldehyde resin. The urea-formaldehyde may react with the phenol compound and the alkoxylated bio-oil to give a phenol-urea-formaldehyde resin incorporating the alkoxylated bio-oil.

In some embodiments, the bio-oil may include the bio-oil polyol. The bio-oil may include an intermediate bio-oil polyol. The intermediate bio-oil polyol may include the bio-oil modified by reaction with the bio-oil. The intermediate bio-oil polyol may include the bio-oil modified by reaction with a reagent polyol. The bio-oil may include an alkoxylated bio-oil polyol. The method may include the alkoxylated bio-oil polyol according to any description herein. The method may include producing the alkoxylated bio-oil polyol according to any method described herein.

In several embodiments, a method of preparing a polyol bio-oil product is provided. The method may include providing a bio-oil starting material in a reaction mixture. The reaction mixture may include a plurality of reactive oxygen groups. The bio-oil starting material may include at least a portion of the plurality of reactive oxygen groups. The method may also include reacting the bio-oil starting material in the reaction mixture to form a polyol bio-oil product. The polyol bio-oil product may include a plurality of functional groups that include carbon-oxygen bonds. The carbon-oxygen bonds may be formed by reacting the bio-oil starting material in the reaction mixture. The polyol bio-oil product may include a plurality of free hydroxyl groups.

In various embodiments, the plurality of reactive oxygen groups may include one or more of free hydroxyls, carboxylic acids, carbonyls, or cyclic alkylene oxides. At least a portion of the plurality of free hydroxyl groups included by the polyol bio-oil product may be derived from a portion of plurality of free hydroxyl groups included by the bio-oil starting material. At least a portion of the plurality of free hydroxyl groups included by the polyol bio-oil product may be formed by reacting the bio-oil starting material in the reaction mixture to transform at least a portion of the plurality of reactive oxygen groups into the at least a portion of the plurality of free hydroxyl groups included by the polyol bio-oil product.

In some embodiments, the method may also include providing one or more of a reagent polyol or a cyclic alkylene oxide to the reaction mixture. At least a portion of the plurality of reactive oxygen groups may be provided by one or more of the reagent polyol or the cyclic alkylene oxide. Reacting the bio-oil starting material in the reaction mixture to form the polyol bio-oil product may include reacting the bio-oil starting material with one or more of the reagent polyol or the cyclic alkylene oxide.

In several embodiments, the method may also include providing a catalyst to the reaction mixture. The catalyst may contribute to reacting the bio-oil starting material in the reaction mixture to form the polyol bio-oil product. Suitable catalysts may be based on metallic compounds of mercury, lead, tin, bismuth, zinc, or the like. For example, mercury carboxylates, bismuth carboxylates, zinc carboxylates, alkyl tin carboxylates (such as tin (II) oxalate), oxides, and mercaptides, or the like may be suitable catalysts. For example, the method may include providing a tin (II) oxalate catalyst to the reaction mixture. The tin (II) oxalate catalyst may contribute to reacting the bio-oil starting material in the reaction mixture to form the polyol bio-oil product.

In various embodiments, the bio-oil starting material may include at least a portion of the reactive oxygen groups including at least free hydroxyls and free carboxylic acids. Forming the carbon-oxygen bonds may include forming ester bonds between at least a portion of the free hydroxyls and the free carboxylic acids included by the bio-oil starting material.

In some embodiments, the bio-oil starting material may include at least a portion of the reactive oxygen groups including at least free carboxylic acids. The method may also include adding one or more of a reagent polyol or a cyclic alkylene oxide to the reaction mixture. Forming the carbon-oxygen bonds may include forming ester bonds by reacting the free carboxylic acids of the bio-oil starting material with one or more of the reagent polyol or the cyclic alkylene oxide. The added polyol reagent may include one or more of a sugar alcohol, an alkylene glycol, a polyalkylene glycol, and the like. Examples of sugar alcohols and alkylene glycols may include, but are not limited to, glycerol, ethylene glycol, propylene glycol (1,2-propane diol), 1,3-propanediol, 2-methyl-1,3-propanediol, pentaerythritol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, or the like. Examples of polyalkylene glycols may include, but are not limited to, a polyethylene glycol, a polypropylene glycol, or a poly(tetramethylene ether) glycol, or the like.

For example, the added polyol reagent may include one or more of glycerol, ethylene glycol, propylene glycol (1,2-propane diol), 1,3-propanediol, 2-methyl-1,3-propanediol, pentaerythritol, a sugar alcohol, a polyethylene glycol, a polypropylene glycol, or a poly(tetramethylene ether) glycol.

In several embodiments, the added cyclic alkylene oxide may include one or more of ethylene oxide or propylene oxide.

In various embodiments, the method may also include pyrolyzing biomass to provide the bio-oil starting material. Biomass may include, for example, lignin, cellulose, or lignocelluloses or mixtures thereof.

In some embodiments, a polyol bio-oil product for use in forming a polyester or a polyurethane is provided. The polyol bio-oil product may be produced by a process. The process may include providing a bio-oil starting material in a reaction mixture. The reaction mixture may include a plurality of reactive oxygen groups. The bio-oil starting material may include at least a portion of the plurality of reactive oxygen groups. The process may also include reacting the bio-oil starting material in the reaction mixture to form a polyol bio-oil product. The polyol bio-oil product may include a plurality of functional groups including carbon-oxygen bonds formed by reacting the bio-oil starting material in the reaction mixture. The polyol bio-oil product may include a plurality of free hydroxyl groups.

In several embodiments, the plurality of reactive oxygen groups may include one or more of free hydroxyls, carboxylic acids, carbonyls, or cyclic alkylene oxides. At least a portion of the plurality of free hydroxyl groups included by the polyol bio-oil product may be derived from a portion of plurality of free hydroxyl groups included by the bio-oil starting material. At least a portion of the plurality of free hydroxyl groups included by the polyol bio-oil product may be formed by reacting the bio-oil starting material in the reaction mixture to transform at least a portion of the plurality of reactive oxygen groups into the at least a portion of the plurality of free hydroxyl groups included by the polyol bio-oil product.

In various embodiments, the process may also include providing one or more of a reagent polyol or a cyclic alkylene oxide to the reaction mixture. At least a portion of the plurality of reactive oxygen groups may be provided by one or more of the reagent polyol or the cyclic alkylene oxide. Reacting the bio-oil starting material in the reaction mixture to form the polyol bio-oil product may include reacting the bio-oil starting material with one or more of the reagent polyol or the cyclic alkylene oxide.

In some embodiments, the process may also include providing a catalyst to the reaction mixture. The catalyst may contribute to reacting the bio-oil starting material in the reaction mixture to form the polyol bio-oil product. Suitable catalysts may be based on metallic compounds of mercury, lead, tin, bismuth, zinc, or the like. For example, mercury carboxylates, bismuth carboxylates, zinc carboxylates, alkyl tin carboxylates (such as tin (II) oxalate), oxides, and mercaptides, or the like may be suitable catalysts. For example, the method may include providing a tin (II) oxalate catalyst to the reaction mixture. The tin (II) oxalate catalyst may contribute to reacting the bio-oil starting material in the reaction mixture to form the polyol bio-oil product.

In several embodiments, the bio-oil starting material may include at least a portion of the reactive oxygen groups including at least free hydroxyls and free carboxylic acids. Forming the carbon-oxygen bonds may include forming ester bonds between at least a portion of the free hydroxyls and the free carboxylic acids included by the bio-oil starting material.

In various embodiments, the bio-oil starting material may include at least a portion of the reactive oxygen groups including at least free carboxylic acids. The method may also include adding one or more of a reagent polyol or a cyclic alkylene oxide to the reaction mixture. Forming the carbon-oxygen bonds may include forming ester bonds by reacting the free carboxylic acids of the bio-oil starting material with one or more of the reagent polyol or the cyclic alkylene oxide. The added polyol reagent may include one or more of a sugar alcohol, an alkylene glycol, a polyalkylene glycol, and the like. Examples of sugar alcohols and alkylene glycols may include, but are not limited to, glycerol, ethylene glycol, propylene glycol (1,2-propane diol), 1,3-propanediol, 2-methyl-1,3-propanediol, pentaerythritol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, or the like. Examples of polyalkylene glycols may include, but are not limited to, a polyethylene glycol, a polypropylene glycol, or a poly(tetramethylene ether) glycol, or the like.

For example, the added polyol reagent may include one or more of glycerol, ethylene glycol, propylene glycol (1,2-propane diol), 1,3-propanediol, 2-methyl-1,3-propanediol, pentaerythritol, a sugar alcohol, a polyethylene glycol, a polypropylene glycol, or a poly(tetramethylene ether) glycol.

In various embodiments, the added cyclic alkylene oxide may include one or more of ethylene oxide or propylene oxide.

In some embodiments, the process may also include pyrolyzing biomass to provide the bio-oil starting material. Biomass may include, for example, lignin, cellulose, or lignocelluloses or mixtures thereof.

In another embodiment, a polyol bio-oil product for use in forming a polyester or a polyurethane is provided. The polyol bio-oil product may be produced by a process. The process may include providing a bio-oil starting material in a reaction mixture. The reaction mixture may include a plurality of reactive oxygen groups. The bio-oil starting material may include at least a portion of the plurality of reactive oxygen groups. The process may also include reacting the bio-oil starting material in the reaction mixture to form a polyol bio-oil product. The polyol bio-oil product may include a plurality of functional groups including carbon-oxygen bonds formed by reacting the bio-oil starting material in the reaction mixture. The polyol bio-oil product may include a plurality of free hydroxyl groups.

In various embodiments, a method for producing a polymer composition may be provided. The method for producing a polymer composition may include providing a polyol bio-oil product. The method for producing a polymer composition may include conducting a polyester or polyurethane polymerization to form the polymer composition. The polyester or polyurethane polymerization may include reacting the polyol bio-oil as a reagent with one or more monomers or crosslinkers. The polymer composition may covalently incorporate at least a portion of the polyol bio-oil product.

In several embodiments, the one or more monomers or crosslinkers may include at least one of a cyclic alkylene oxide, a polycarboxylate reagent, and a polyol reagent. Reacting the polyol bio-oil product with the one or more monomers or crosslinkers may form the polymer composition including a polyester.

In various embodiments, the method for producing a polymer composition may also include adding a polyester polymerization catalyst. The polyester polymerization catalyst may contribute to reacting the polyol bio-oil product with the one or more monomers or crosslinkers to form the polymer composition. Suitable polyester catalysts may include, for example, antimony trioxide, antimony triacetate, alkali hydroxides such as potassium hydroxide, oligomeric aluminoxane, or the like. Further crosslinking may be obtained with organic peroxide catalysts such as methyl ethyl ketone peroxide, benzoyl peroxide, or the like. Metallic compounds based on mercury, lead, tin, bismuth, and zinc may be suitable as polyester catalysts, e.g., mercury carboxylates, bismuth carboxylates, zinc carboxylates, alkyl tin carboxylates (such as tin (II) oxalate), oxides, and mercaptides, or the like.

In some embodiments, the one or more monomers or crosslinkers may include a polyisocyanate. Reacting the polyol bio-oil product with the one or more monomers or crosslinkers may form the polymer composition including a polyurethane. Suitable polyisocyanates may include, but are not limited to, toluene diisocyanate, methylene diphenyl diisocyanate, 1,6-hexamethylene diisocyanate, 1-isocyanato-3-isocyanatomethyl-3,5,5-trimethyl-cyclohexane, 4,4'-diisocyanato dicyclohexylmethane, or the like.

In several embodiments, the method for producing a polymer composition may also include adding a polyurethane polymerization catalyst for reacting the polyol bio-oil product with one or more monomers or crosslinkers to form the polymer composition. Suitable polyurethane catalysts may include, but are not limited to amine compounds and metal complexes. Suitable amine catalysts may include, but are not limited to, tertiary amines such as triethylenediamine, dimethylcyclohexylamine, dimethylethanolamine, or the like. Metallic compounds based on mercury, lead, tin, bismuth, and zinc may be suitable as polyurethane catalysts, e.g., mercury carboxylates, bismuth carboxylates, zinc carboxylates, alkyl tin carboxylates (such as tin (II) oxalate), oxides, and mercaptides, or the like.

In various embodiments, a polymer composition is provided. The polymer composition may include one or more of a polyester or a polyurethane. The polyester or the polyurethane may covalently incorporate a polyol bio-oil product. In various embodiments, the polyol bio-oil product may be provided according to any of the subject matter described herein. In several embodiments, the polymer composition may be prepared according to any of the subject matter described herein.

In another embodiment, a polymer composition is provided. The polymer composition may include one or more of a polyester or a polyurethane. The polyester or the polyurethane may covalently incorporate a polyol bio-oil product. The polyol bio-oil product may be provided according to any of the subject matter described herein. The polymer composition may be prepared according to any of the subject matter described herein.

EXAMPLES

Example 1A—Modification of Catalytic Bio-Oil Produces Catalytic Intermediate Bio-Oil Polyol About 1723.3 g (grams) of catalytically-produced bio-oil was reacted with about 181.65 g of glycerol in the presence of about 1.16 g of tin (II) oxalate. The reaction was heated at about 225° C. for 4 hours. The reaction was held for 40 minutes, after which 0.25 standard cubic feet per hour (SCFH) of argon headspace flow was added for 1 hour. The material was poured into a silicone mold, cooled, and broken to result in an intermediate bio-oil polyol as a glassy solid.

Example 1B—Alkoxylation of Catalytic Intermediate Bio-Oil Polyol Produces Alkoxylated Catalytic Bio-Oil Polyol A reaction mixture was formed in an autoclave reactor by combining about 900.17 g of the intermediate bio-oil polyol of EXAMPLE 1A, about 600 g of propylene oxide, and about 10.85 g of potassium hydroxide. The reaction mixture was stirred in the autoclave under about 200 psi of argon for 1 hour. The autoclave reactor was then heated at about 130° C. and a pressure of about 450 psi, and the reaction mixture was stirred for an additional 4 hours. The reaction mixture was cooled to ambient temperature to result in an alkoxylated bio-oil polyol, derived from catalytically-produced bio-oil as a tacky viscous liquid.

Example 2A—Modification of Non-Catalytic Bio-Oil Produces Non-Catalytic Intermediate Bio-Oil Polyol About 1665.50 g of non-catalytically produced bio-oil was reacted with about 183.96 g of glycerol in the presence of about 10.02 g of tin (II) oxalate. The reaction was heated at about 225° C. for about 4 hours. The reaction was held for about 40 minutes, after which 0.25 SCFH of argon headspace flow was added for about 1 hour. The material was poured into a Teflon lined mold and resulted in an intermediate bio-oil polyol that is derived from non-catalytically produced bio-oil. The intermediate bio-oil polyol was a glassy solid.

Example 2B—Alkoxylation of Non-Catalytic Intermediate Bio-Oil Polyol Produces Alkoxylated Non-Catalytic Bio-Oil Polyol A reaction mixture was formed in an autoclave reactor by combining about 1632.40 g of the intermediate bio-oil polyol of EXAMPLE 2A, about 1074.82 g of propylene oxide, and about 13.60 g of potassium hydroxide. The reaction mixture was placed under about 5 psi. The autoclave reactor was heated at about 130° C., stirred, and a pressure of about 160 psi developed over the 4 hours of reaction time. The reaction mixture was cooled to ambient temperature to result in an alkoxylated bio-oil polyol, derived from non-catalytically-produced bio-oil, in the form of a tacky viscous liquid.

Example 3A—Formation of Control Foam Using Conventional Petroleum Polyol

Figure 3:
FIG. 3 is a table of polymer foam properties according to alkoxylated bio-oil polyol incorporation as described in the Examples.

A foamable reaction mixture was formed by combining: about 50 parts of petroleum polyol (JEFFOL® SG 360, Huntsman, Auburn Hills, Mich.), about 2.25 parts of water, about 2 parts of a silicone surfactant (DABCO® DC193, Air Products, Allentown, Pa.; sold as industry standard silicone surfactant for conventional rigid polyurethane foam), about 0.5 parts 33% triethylene diamine in 67% dipropylene glycol (DABCO® 33-LV, Air Products, Allentown, Pa.; a tertiary amine catalyst for promoting urethane (polyol isocyanate) reactions), about 0.16 parts of 70 percent bis(2-dimethylaminoethyl) ether in 30 weight percent dipropylene glycol (NIAX*™ A1, Momentive Performance Materials Inc., Columbus Ohio; an active amine catalyst for forming urethane foam), and about 82.55 parts of 4,4'-diphenylmethane diisocyanate containing isomers and oligomers (LUPRANATE® M20S, BASF, Florham Park, N.J., a urethane forming reagent). The components of the reaction mixture were combined at the same time, except for the 4,4'-diphenylmethane diisocyanate, which was added last. The foamable reaction mixture containing 50 parts petroleum polyol was reacted at ambient temperature to form a polyurethane foam composition characterized by a density of 1.99 g/cubic centimeter and a maximum load in psi of 111.0±9.9. See also table 300 in FIG. 3, column 303.

Example 3B—Formation of Foam Using Catalytically Derived Alkoxylated Bio-Oil to Replace 50% of Conventional Petroleum Polyol A foamable reaction mixture was formed using 25 parts of the alkoxylated bio-oil polyol of EXAMPLE 1B, derived from catalytically-produced bio-oil. Also added to the reaction mixture was about 25 parts of parts of the petroleum polyol, about 2.25 parts of water, about 2 parts of the silicone surfactant (DABCO® DC193, Air Products, Allentown, Pa.), about 0.5 parts 33% triethylene diamine in 67% dipropylene glycol (DABCO® 33-LV, Air Products, Allentown, Pa.), about 0.16 parts of 70 percent bis(2-dimethylaminoethyl) ether in 30 weight percent dipropylene glycol (NIAX*™ A1, Momentive Performance Materials Inc., Columbus Ohio), and about 78.87 parts of 4,4'-diphenylmethane diisocyanate containing isomers and oligomers (LUPRANATE® M20S, BASF, Florham Park, N.J.). The components of the reaction mixture were combined at the same time, except for the 4,4'-diphenylmethane diisocyanate, which was added last. The mixture was reacted at ambient temperature to form a polyurethane foam composition characterized by a density of 1.88 g/cubic centimeter and a maximum load in psi of 111.0±9.9. See also table 300 in FIG. 3, column 302. Compared to EXAMPLE 3A, the present example represents replacement of about 50% of the petroleum polyol with the alkoxylated bio-oil polyol of EXAMPLE 1B, derived from catalytically-produced bio-oil.

Example 3C—Foam Formed Using Non-Catalytically Derived Alkoxylated Bio-Oil to Replace 50% of Conventional Petroleum Polyol A foamable reaction mixture was formed using 25 parts of the alkoxylated bio-oil polyol of EXAMPLE 2B, derived from catalytically-produced bio-oil. Also added to the reaction mixture was about 25 parts of parts of a petroleum polyol, about 2.25 parts of water, about 2 parts of the silicone surfactant (DABCO® DC193, Air Products, Allentown, Pa.), about 0.5 parts 33% triethylene diamine in 67% dipropylene glycol (DABCO® 33-LV, Air Products, Allentown, Pa.), about 0.16 parts of 70 percent bis(2-dimethylaminoethyl) ether in 30 weight percent dipropylene glycol (NIAX*™ A1, Momentive Performance Materials Inc., Columbus Ohio), and about 78.87 parts of 4,4'-diphenylmethane diisocyanate containing isomers and oligomers (LUPRANATE® M20S, BASF, Florham Park, N.J.). The components of the reaction mixture were combined at the same time, except for the 4,4'-diphenylmethane diisocyanate, which was added last. The mixture was reacted at ambient temperature to form a polyurethane foam composition characterized by a density of 2.13 g/cubic centimeter and a maximum load in psi of 134.0±16.4. See also table 300 in FIG. 3, column 302. Compared to EXAMPLE 3A, the present example represents replacement of about 50% of the petroleum polyol with the alkoxylated bio-oil polyol of EXAMPLE 1B, derived from non-catalytically-produced bio-oil.

Figure 6A:
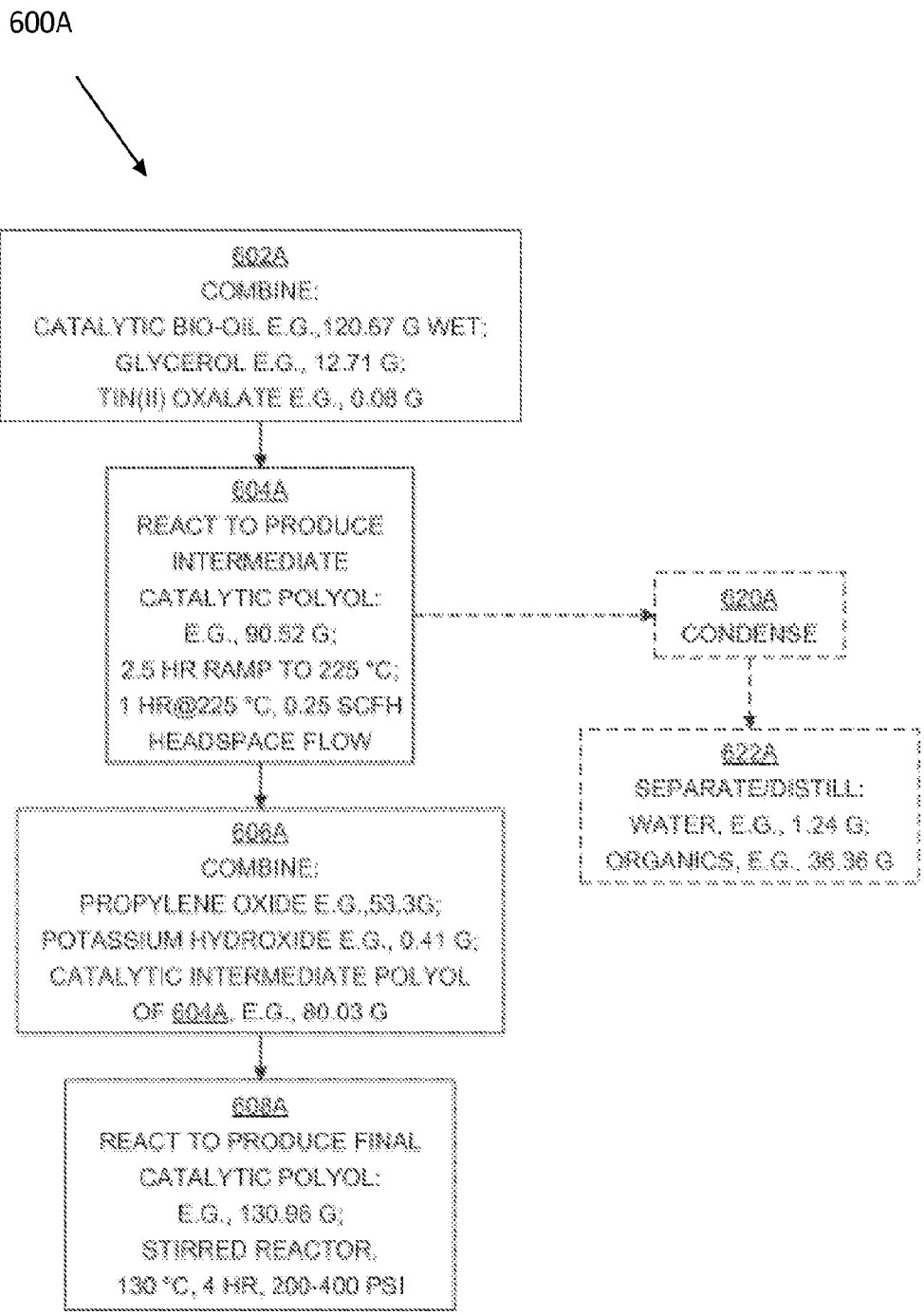
FIG. 6A is a flow diagram outlining a method 600A described in EXAMPLE 4A.

Example 4A—Modification of Catalytic Bio-Oil Produces Catalytic Intermediate Bio-Oil Polyol; Alkoxylation Produces Alkoxylated Catalytic Bio-Oil Polyol FIG. 6A is a flow diagram outlining an example method 600A described in EXAMPLE 4A. Reagents were (602A) combined in a reactor, including about 120.67 g of catalytically-produced bio-oil, about 12.71 g of glycerol, and about 0.08 g of tin (II) oxalate. The combined reagents were (604A) reacted by heating the reactor at about 225° C. for 2.5 hours. The reaction was held for 1 hour under 0.25 SCFH of argon headspace flow. Vapor evolved from the reaction (604A) were (620A) condensed and (622A) separated to provide about 1.24 g of water and about 36.36 g of organic distillate. The reaction (604A) was cooled and about 90.52 g of catalytic intermediate bio-oil polyol was isolated. About 53.3 g of propylene oxide, about 0.41 g of potassium hydroxide, and about 80.03 g of the catalytic intermediate bio-oil polyols from (604A) were (606A) combined in a stirred tank reactor. The combined reagents were (608A) reacted in the stirred tank reactor for about 4 hours at about 130° C. and about 200-400 psi of argon. Upon cooling, about 130.96 g of alkoxylated catalytic bio-oil polyol was isolated.

Figure 6B:
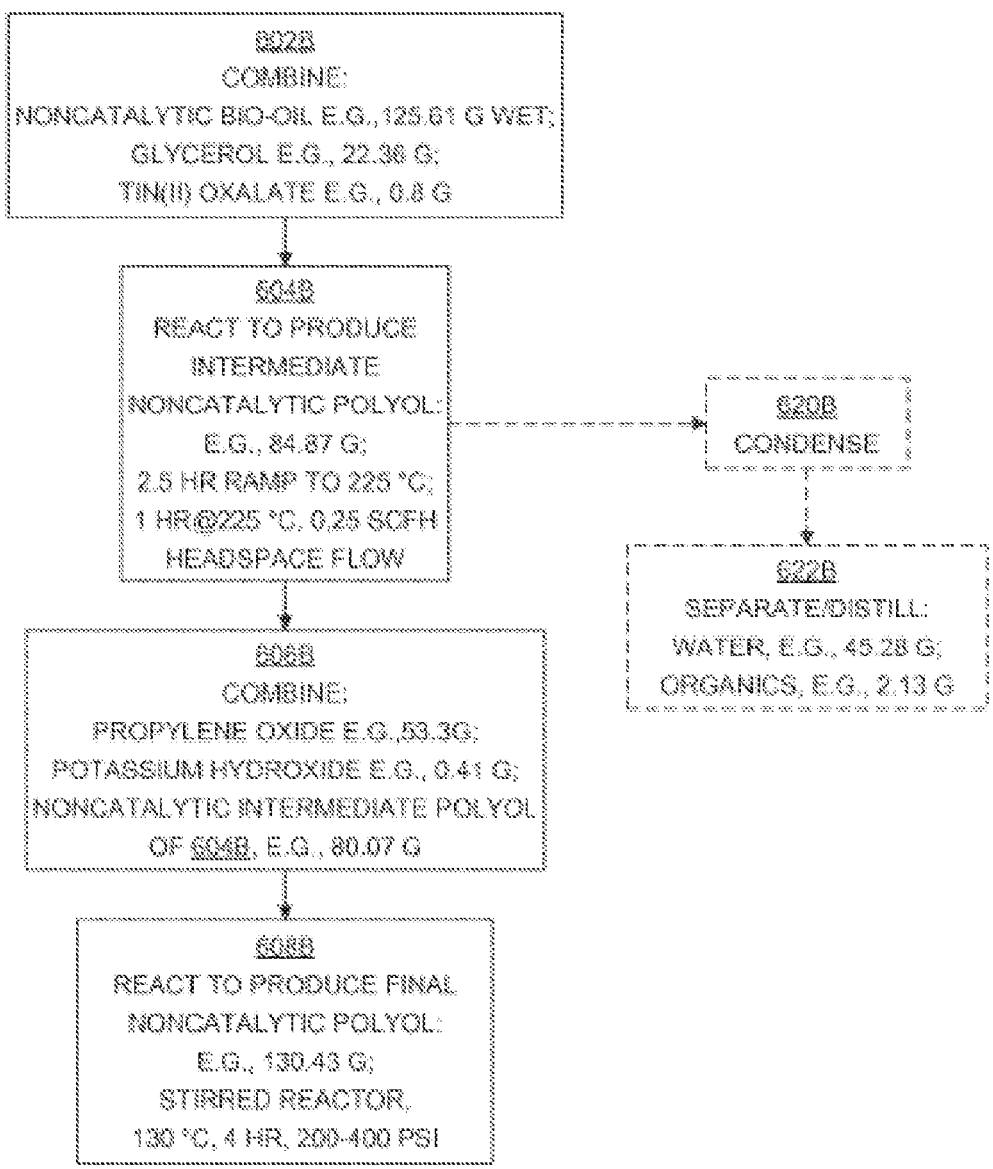
FIG. 6B is a flow diagram outlining a method 600B described in EXAMPLE 4B.

Example 4B—Modification of Non-Catalytic Bio-Oil Produces Non-Catalytic Intermediate Bio-Oil Polyol; Alkoxylation Produces Alkoxylated Non-Catalytic Bio-Oil Polyol FIG. 6B is a flow diagram outlining an example method 600B described in EXAMPLE 4B. Reagents were (602B) combined in a reactor, including 125.61 g of wet, non-catalytically-produced bio-oil, about 22.36 g of glycerol, and about 0.08 g of tin (II) oxalate. The combined reagents were (604B) reacted by heating the reactor at about 225° C. for 2.5 hours, then the reaction was held for 1 hour under 0.25 standard cubic feet per hour (SCFH) of argon headspace flow. Vapor evolved from the reaction (604B) was (620B) condensed and (622B) separated to provide about 45.28 g of water and about 2.13 g of organic distillate. The reaction (604B) was cooled and about 84.87 g of non-catalytic intermediate bio-oil polyol was isolated. About 53.3 g of propylene oxide, about 0.41 g of potassium hydroxide, and about 80.07 g of the catalytic intermediate bio-oil polyols from (604B) were (606B) combined in a stirred tank reactor. The combined reagents were (608B) reacted in the stirred tank reactor for about 4 hours at about 130° C. and about 200-400 psi of argon. Upon cooling, about 130.43 g of alkoxylated non-catalytic bio-oil polyol was isolated.

Example 5—Alkoxylation of Catalytic Intermediate Bio-Oil Polyol Produces Alkoxylated Catalytic Bio-Oil Polyol A reaction mixture was formed in an autoclave reactor by combining about 2105.38 g of the intermediate bio-oil polyol of EXAMPLE 2A and about 17.63 g of potassium hydroxide. The reaction mixture was heated at about 140° C. and then stirred in an autoclave after being flushed with argon. About 1386.22 g of propylene oxide were added with a dose meter in order to maintain a pressure of less than 50 psi. The reactor was held at 140° C. for 4 hours after addition of the propylene oxide. The reaction mixture was cooled to ambient temperature to result in an alkoxylated bio-oil polyol, in the form of a tacky viscous liquid, derived from non-catalytically-produced bio-oil.

Example 6A—Modification of Catalytic Bio-Oil Produces Catalytic Intermediate Bio-Oil Polyol About 60.93 g of catalytically-produced bio-oil was reacted with itself in the presence of about 0.04 g of tin (II) oxalate. The reaction was heated at about 225° C. for 4 hours. The reaction was then held for 40 minutes, after which 0.25 standard cubic feet per hour (SCFH) of argon headspace flow was added for 1 hour. The material was poured into a silicone mold and broken once cooled to result in an intermediate bio-oil polyol as a glassy solid.

Example 6B—Alkoxylation of Catalytic Intermediate Bio-Oil Polyol Produces Alkoxylated Catalytic Bio-Oil Polyol A reaction mixture was formed in an autoclave reactor by combining about 19.97 g of the intermediate bio-oil polyol of EXAMPLE 6A, about 13.39 g of propylene oxide, and about 0.13 g of potassium hydroxide. The reaction mixture was stirred in the autoclave under about 200 psi of argon for 1 hour. The autoclave reactor was then heated at about 130° C. and a pressure of about 450 psi, and the reaction mixture was stirred for an additional 4 hours. The reaction mixture was cooled to ambient temperature to result in an alkoxylated bio-oil polyol as a tacky viscous liquid, derived from catalytically-produced bio-oil.

Example 7A—Alkoxylation of Catalytic Intermediate Bio-Oil Polyol Produces Alkoxylated Catalytic Bio-Oil Polyol A reaction mixture was formed in an autoclave reactor by combining about 60.30 g of the intermediate bio-oil polyol of EXAMPLE 1A, about 9.08 g of sucrose, about 10.62 g of glycerol, about 139.97 g of propylene oxide, and about 0.33 g of potassium hydroxide. The reaction mixture was stirred in the autoclave under about 200 psi of argon for 1 hour. The autoclave reactor was then heated at about 130° C. and a pressure of about 450 psi, and the reaction mixture was stirred for an additional 4 hours. The reaction mixture was cooled to ambient temperature to result in a liquid alkoxylated bio-oil polyol derived from catalytically-produced bio-oil.

Example 7B—Alkoxylated Catalytic Bio-Oil Polyol is a 100% Replacement for Petroleum Polyol in Rigid Foam A foamable reaction mixture was formed using 50 parts of the alkoxylated bio-oil polyol derived from catalytically-produced bio-oil of EXAMPLE 7A. Also added to the reaction mixture was about 2.25 parts of water, about 2 parts of a silicone surfactant (DABCO® DC193, Air Products, Allentown, Pa.), about 0.5 parts 33% triethylene diamine in 67% dipropylene glycol (DABCO® 33-LV, Air Products, Allentown, Pa.), about 0.16 parts of 70 percent bis(2-dimethylaminoethyl) ether in 30 weight percent dipropylene glycol (NIAX*® A1, Momentive Performance Materials Inc., Columbus Ohio), and about 80.15 parts of 4,4'-diphenylmethane diisocyanate containing isomers and oligomers (LUPRANATE® M20S, BASF, Florham Park, N.J.). The components of the reaction mixture were combined at the same time, except for the 4,4'-diphenylmethane diisocyanate, which was added last. See also table 300 in FIG. 3, column 302. Compared to EXAMPLE 3A, the present example represents replacement of about 100% of the petroleum polyol with the alkoxylated bio-oil polyol derived from catalytically-produced bio-oil.

Example 8A—Modification of Non-Catalytic Bio-Oil Produces Non-Catalytic Intermediate Bio-Oil Polyol About 957.87 g of non-catalytically-produced bio-oil was reacted with about 359.07 g of glycerol in the presence of about 0.73 g of tin (II) oxalate. The reaction was heated at about 225° C. for 4 hours. The reaction was then held for 40 minutes, after which 0.25 standard cubic feet per hour (SCFH) of argon headspace flow was added for 1 hour. The material was poured into a jar to result in an intermediate non-catalytic bio-oil polyol as a viscous liquid.

Example 8B—Alkoxylation of Non-Catalytic Intermediate Bio-Oil Polyol Produces Alkoxylated Catalytic Bio-Oil Polyol A reaction mixture was formed in an autoclave reactor by combining about 457.50 g of the intermediate bio-oil polyol of EXAMPLE 8A, about 32.84 g of sucrose, about 600.91 g of propylene oxide, and about 3.21 g of potassium hydroxide. The reaction mixture was stirred in the autoclave under about 180 psi of argon for 1 hour. The autoclave reactor was then heated at about 130° C. and the reaction mixture was stirred for an additional 4 hours. The reaction mixture was cooled to ambient temperature to result in an alkoxylated bio-oil polyol as a viscous liquid, derived from non-catalytically-produced bio-oil.

Example 8C—Alkoxylated Non-Catalytic Bio-Oil Polyol is a 100% Replacement for Petroleum Polyol in Rigid Foam A foamable reaction mixture was formed using 50 parts of the alkoxylated bio-oil polyol derived from non-catalytically-produced bio-oil of EXAMPLE 8B. Also added to the reaction mixture was about 2.25 parts of water, about 2 parts of the silicone surfactant (DABCO® DC193, Air Products, Allentown, Pa.), about 0.5 parts 33% triethylene diamine in 67% dipropylene glycol (DABCO® 33-LV, Air Products, Allentown, Pa.), about 0.16 parts of 70 percent bis(2-dimethylaminoethyl) ether in 30 weight percent dipropylene glycol (NIAX*™ A1, Momentive Performance Materials Inc., Columbus Ohio), and about 78.70 parts of 4,4'-diphenylmethane diisocyanate containing isomers and oligomers (LUPRANATE® M20S, BASF, Florham Park, N.J.). The components of the reaction mixture were combined at the same time, except for the 4,4'-diphenylmethane diisocyanate, which was added last. The mixture was reacted at ambient temperature to form a polyurethane foam composition characterized by a density of 1.93 g/cubic centimeter and a maximum load in psi of 119.0±13.4. See also table 300 in FIG. 3, column 302. Compared to EXAMPLE 3A, the present example represents replacement of about 100% of the petroleum polyol with the alkoxylated bio-oil polyol derived from non-catalytically-produced bio-oil.

Prophetic Example 9A—Formation of Intermediate Bio-Oil Polyol

An intermediate polyol may be prepared by reacting bio-oil, for example catalytic bio-oil, with itself or with another polyol. For example, a sample of catalytic bio-oil may be combined to form a reaction mixture with between about 0 weight % and about 33 weight % of a reagent polyol, for example, about 12 weight % of glycerol. A catalyst may be added to the reaction mixture, for example, between about 0.01 weight % to about 5 weight %, e.g., about 0.05 weight % of tin(II) oxalate. The reaction mixture and catalyst may be stirred and heated at about 140° C. under an argon flow. The reaction mixture may be allowed to react until an acid value may be driven to less than about 3 milligrams potassium hydroxide per g equivalent. The resulting material may be poured into a silicone mold while hot. The resulting material may be cooled to ambient temperature in the mold and may be ground up to form a ground intermediate polyol.

Example 10—Production of Alkoxylated Bio-Oil

A reaction mixture was formed in an autoclave reactor by combining about 60.30 g of the intermediate bio-oil polyol of EXAMPLE 1A, about 9.08 g of sucrose, about 4.82 g of glycerol, about 139.97 g of propylene oxide, and about 0.33 g of potassium hydroxide. The reaction mixture was stirred in an autoclave under about 200 psi of argon for 1 hour. The autoclave reactor was then heated at about 130° C. and a pressure of about 450 psi, and the reaction mixture was stirred for an additional 4 hours. The reaction mixture was cooled to ambient temperature to result in an alkoxylated bio-oil polyol, derived from catalytically-produced bio-oil as a liquid.

Example 11—Production of Intermediate Bio-Oil Polyol

About 150.30 g of catalytically-produced bio-oil was reacted with about 50.39 g of glycerol in the presence of about 0.10 g of tin (II) oxalate. The reaction was heated to about 225° C. over 4 hours. The reaction was held for 1 hour, after which 0.25 SCFH of argon headspace flow was added for 1 hour. The material was poured into a silicone mold, cooled, and transferred to jar to result in an intermediate bio-oil polyol as a taffy-like mass.

Example 12—Production of Alkoxylated Bio-Oil Polyol

A reaction mixture was formed in an autoclave reactor by combining about 40.95 g of the intermediate bio-oil polyol of EXAMPLE 11, about 5.76 g of sucrose, about 79.16 g of propylene oxide, and about 0.12 g of potassium hydroxide. The reaction mixture was stirred in the autoclave under about 200 psi of argon for 1 hour. The autoclave reactor was then heated at about 130° C. and a pressure of about 450 psi, and the reaction mixture was stirred for an additional 4 hours. The reaction mixture was cooled to ambient temperature to result in an alkoxylated bio-oil polyol, derived from catalytically-produced bio-oil as a liquid.

Example 13—Production of Intermediate Bio-Oil Polyol

About 957.87 g of non-catalytically-produced bio-oil was reacted with about 357.07 g of glycerol in the presence of about 0.73 g of tin (II) oxalate. The reaction was heated to about 225° C. over 4 hours. The reaction was held for 1 hour, after which 0.25 SFCH of argon headspace flow was added for 1 hour. The material was poured into a jar to result in an intermediate bio-oil polyol as a taffy-like mass.

Example 14—Production of Alkoxylated Bio-Oil Polyol

A reaction mixture was formed in an autoclave reactor by combining about 457.50 g of the intermediate bio-oil polyol of EXAMPLE 13, about 32.84 g of sucrose, about 600.91 g of propylene oxide, and about 3.21 g of potassium hydroxide. The reaction mixture was stirred in the autoclave under about 180 psi of argon for 1 hour. The autoclave reactor was then heated at about 130° C. and the reaction mixture was stirred for an additional 4 hours. The reaction mixture was cooled to ambient temperature to result in an alkoxylated bio-oil polyol, derived from non-catalytically-produced bio-oil as a liquid.

Example 15—Production of Intermediate Bio-Oil Polyol

About 1569.50 g of non-catalytically-produced bio-oil, including water and oil layers, was reacted with about 301.45 g of glycerol in the presence of about 0.78 g of tin (II) oxalate. The reaction was heated to about 225° C. over 9 hours. The reaction was held for 1 hour, after which 0.25

SCFH of argon headspace flow was added for 1 hour. The material was poured into a jar to result in an intermediate bio-oil polyol as a taffy-like mass.

Example 16—Production of Alkoxylated Bio-Oil Polyol

A reaction mixture was formed in an autoclave reactor by combining about 549.76 g of the intermediate bio-oil polyol of EXAMPLE 15, about 674.00 g of propylene oxide, and about 3.34 g of potassium hydroxide. The reaction mixture was heated to 50° C. in the autoclave under about 5 psi and then stirred for 10 minutes. The autoclave reactor was then heated to about 130° C. and the reaction mixture was stirred for an additional 4 hours. The reaction mixture was cooled to ambient temperature to result in an alkoxylated bio-oil polyol, derived from non-catalytically-produced bio-oil as liquid.

Example 17—Production of Intermediate Bio-Oil Polyol

About 1569.43 g of non-catalytically-produced bio-oil, including water and oil layers, was reacted with about 300.70 g of glycerol in the presence of about 0.82 g of tin (II) oxalate. The reaction was heated to about 225° C. over 9 hours. The reaction was held for 1 hour, after which 0.25 SCFH of argon headspace flow was added for 1 hour. The material was poured into a jar to result in an intermediate bio-oil polyol as a taffy-like mass.

Example 18—Production of Alkoxylated Bio-Oil Polyol

A reaction mixture was formed in an autoclave reactor by combining about 550.06 g of the intermediate bio-oil polyol of EXAMPLE 17, about 443.84 g of propylene oxide, and about 3.00 g of potassium hydroxide. The reaction mixture was heated to 50° C. in an autoclave at a pressure of about 5 psi and then stirred for 10 minutes. The autoclave reactor was then heated to about 130° C. and the reaction mixture was stirred for an additional 4 hours. The reaction mixture was cooled to ambient temperature to result in an alkoxylated bio-oil polyol, derived from non-catalytically-produced bio-oil as viscous liquid.

Prophetic Example 19—Production of Intermediate and Final Polyols in Single Pot Reaction About 1569.43 g of non-catalytically-produced bio-oil, including water and oil layers, may be reacted with about 300.70 g of glycerol in the presence of about 0.82 g of tin (II) oxalate. The reaction may be heated to about 225° C. over 9 hours. The reaction may be held for 60 minutes, after which 0.25 standard cubic feet per hour (SCFH) of argon headspace flow may be added for 1 hour. The reaction mixture may then be cooled to 130° C. and about 6.03 g of potassium hydroxide may be added with stirring. About 1201.43 g of propylene oxide may then be delivered slowly by a pump in order to maintain the desired reactor pressure. Once addition is completed, the reaction temperature may be maintained until the reaction completes. The reaction mixture may then be cooled to ambient temperature to result in an alkoxylated bio-oil polyol, derived from non-catalytically-produced bio-oil as viscous liquid.

Example 20A

A sample of a bio-oil starting material high in lignin content ("ESP") was provided. About 73.20 grams of the bio-oil starting material were mixed with about 6.28 grams of 2-methyl-1,3-propanediol and about 0.04 grams of tin (II) oxalate catalyst to form a reaction mixture. The reaction mixture was stirred in an autoclave at about 140° C. under an argon flow. The reaction mixture was allowed to react until the acid value was driven to about 2.62 milligrams potassium hydroxide per gram equivalent. The resulting material was poured into a silicone mold while hot. Once cooled to ambient temperature, the resulting polyol bio-oil product was ground up and placed into a jar. The ground polyol bio-oil product was characterized by a hydroxyl value of 237.4.

Example 20B

Figure 7:
FIG. 7 is a table of polymer foam properties according to polyol bio-oil product incorporation as described in Examples.

The ground polyol bio-oil product of EXAMPLE 20A was then formed into a rigid foam by replacing a standard petroleum based polyol with varying amounts of the ground polyol bio-oil product as described in Table 700 in FIG. 7. As can be seen in in Table 700 in FIG. 7, employing the ground polyol bio-oil product led to high foam densities and high foam load properties.

Example 21A

A sample of a bio-oil starting material high in lignin content ("ESP") was provided. About 133.29 grams of the bio-oil starting material was reacted with 16.98 grams of 2-methyl-1,3-propanediol and 0.07 grams of tin (II) oxalate to form a reaction mixture. The reaction mixture was stirred in an autoclave at about 140° C. under an argon flow. The reaction mixture was allowed to react until the acid value was driven to about 2.15 milligrams potassium hydroxide per gram equivalent. The resulting material was poured into a silicone mold while hot. Once cooled to ambient temperature, the resulting product was a soft semi-solid polyol bio-oil product. The soft semi-solid polyol bio-oil product was characterized by a hydroxyl value of 278.2.

Example 21B

About 15 grams of the polyol of EXAMPLE 21A was combined with about 3.88 grams propylene oxide and about 0.11 grams of potassium hydroxide as catalyst to form a reaction mixture. The reaction mixture was reacted in an autoclave under about 100 pounds per square inch argon at about 130° C. for about 3.5 hours. The resulting viscous polyol/polyester composition was characterized by an acid value less than about 1 milligram potassium hydroxide per gram equivalent.

Example 22A

A sample of a bio-oil starting material high in lignin content ("ESP") was provided. About 120.01 grams of the bio-oil starting material were mixed with about 9.37 grams of glycerol and about 0.07 grams of tin (II) oxalate catalyst to form a reaction mixture. The reaction mixture was stirred in an autoclave at about 140° C. under an argon flow. The reaction mixture was allowed to react until the acid value was driven to about 3.68 milligrams potassium hydroxide per gram equivalent. The resulting polyol bio-oil product was a solid characterized by a melting temperature just above ambient temperature. The resulting polyol bio-oil product was characterized by a hydroxyl value of about 267.

Example 22B

About 15 grams of the polyol bio-oil product of EXAMPLE 22A may be combined with about 2.94 grams ethylene oxide and about 0.11 grams of potassium hydroxide as catalyst to form a reaction mixture. The reaction mixture may be reacted in an autoclave under about 100 pounds per square inch argon at about 130° C. for about 3.5 hours. The resulting polyol/polyester composition may be characterized by an acid value less than about 1 milligram potassium hydroxide per gram equivalent.

Example 23

Samples of each of the resulting polyol bio-oil products of EXAMPLES 20A, 21A, and 22A, or polyol/polyester compositions of EXAMPLES 21B and 22B may be obtained. Each of these samples may be independently contacted with a polyisocyanate such as toluene diisocyanate, and optionally a catalyst, such as tin(II) oxalate to form a polyurethane forming reaction mixture. The reaction mixture may be allowed to react under suitable conditions, for example, heating between about ambient temperature and about 140° C. for 5 minutes to 5 hours. A resulting polyurethane product composition may be obtained on cooling.

Example 24

Samples of each of the resulting polyol bio-oil products of EXAMPLES 20A, 21A, and 22A may be observed to be colored. The samples of each of the resulting polyol bio-oil products of EXAMPLES 20A, 21A, and 22A may be independently contacted with a suitable solvent, such as tetrahydrofuran or an alcohol, to form corresponding polyol bio-oil product solutions. The corresponding polyol bio-oil products or solutions thereof may be independently decolorized, for example, by contacting the corresponding products or solutions with decolorizing carbon, stirring for a period of time, filtering to remove the decolorizing carbon (and removing the suitable solvent if present) to leave a corresponding decolorized polyol bio-oil product.

Example 25

Figure 8:
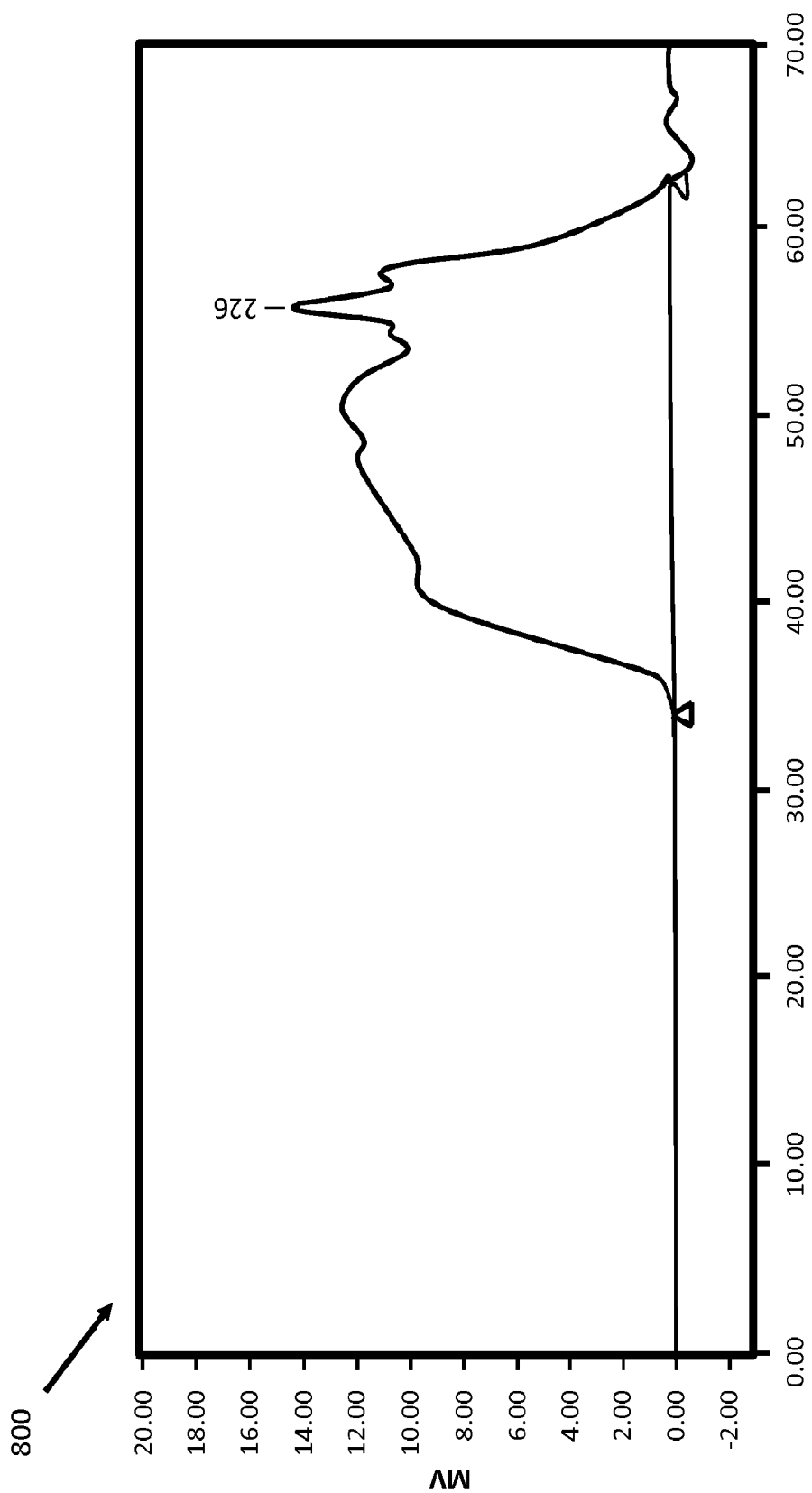
FIG. 8 is a graph of gel permeation chromatography retention time for an example intermediate bio-oil polyol prior to alkoxylation.
Figure 9:
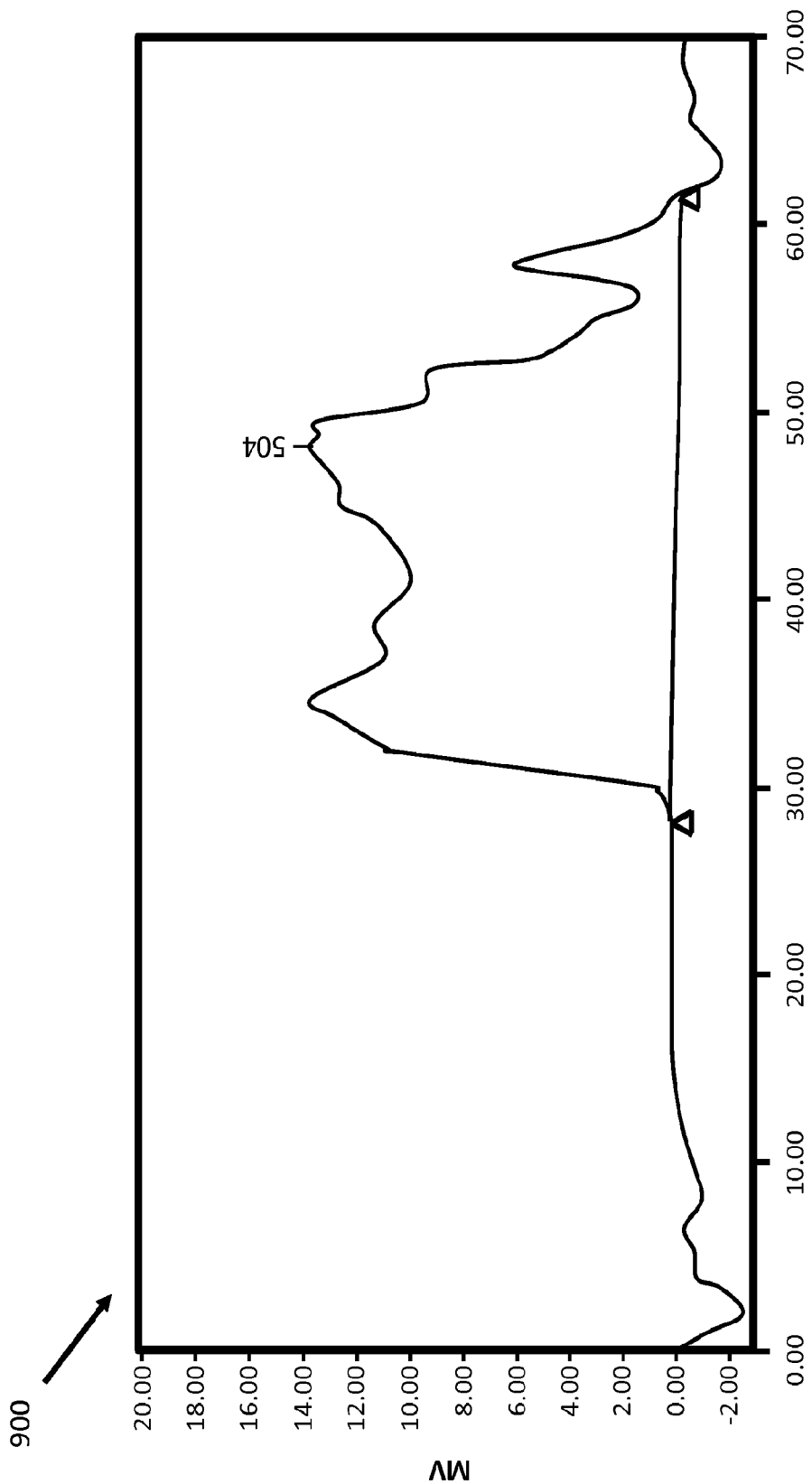
FIG. 9 is a graph of gel permeation chromatography retention time for an example alkoxylated bio-oil polyol.

A sample of an example intermediate bio-oil polyol prior to alkoxylation (with propylene glycol or propylene oxide) was subjected to gel permeation chromatography, as shown in graph 800 of FIG. 8. A sample of a propoxylated bio-oil polyol was also subjected to gel permeation chromatography, as shown in graph 900 of FIG. 9. Graph 800 shows a retention time beginning at about 34 minutes. Graph 900 shows a retention time beginning at about 29 minutes. The reduction in retention time from graph 800 to graph 900 is suggestive of an increase in molecular weight on going from the intermediate bio-oil polyol to the example propoxylated bio-oil polyol. It was also observed that the intermediate bio-oil polyol increases in weight on uptake of the propoxyl groups to form the propoxylated bio-oil polyol. Propoxylation may correspond to a change in polymeric structure from the intermediate bio-oil polyol to the propoxylated bio-oil polyol. Propoxylation was observed to cause a decrease in viscosity from the intermediate bio-oil polyol to the propoxylated bio-oil polyol. Propoxylation was observed to cause a decrease in free hydroxyl groups on going from the intermediate bio-oil polyol to the propoxylated bio-oil polyol.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, and the like. As a non-limiting example, each range discussed herein can be readily broken down into a lower third, middle third and upper third, and the like. As will also be understood by one skilled in the art all language such as "up to," "at least," "greater than," "less than," include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; or nitriles. A "per"-substituted compound or group is a compound or group having all or substantially all substitutable positions substituted with the indicated substituent. For example, 1,6-diiodo perfluoro hexane indicates a compound of formula $C_6F_{12}I_2$, where all the substitutable hydrogens have been replaced with fluorine atoms.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, or carboxyalkyl.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1] hexane, adamantyl, or decalinyl. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl or tetrahydronaphthyl), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl, which may be substituted with substituents such as those above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Substituted aralkyls may be substituted one or more times with substituents as listed above.

Groups described herein having two or more points of attachment (e.g., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, or hexoxy. Examples of branched alkoxy groups include, but are not limited to, isopropoxy, sec-butoxy, tert-butoxy, isopentoxy, or isohexoxy. Examples of cycloalkoxy groups include, but are not limited to, cyclopropyloxy, cyclobutyloxy, cyclopentyloxy, or cyclohexyloxy. Representative substituted alkoxy groups may be substituted one or more times with substituents such as those listed above.

The term "amine" (or "amino"), as used herein, refers to $NR_5R_6$ groups, wherein $R_5$ and $R_6$ may be independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine may be alkylamino, dialkylamino, arylamino, or alkylarylamino. In other embodiments, the amine may be $NH_2$, methylamino, dimethylamino, ethylamino, diethylamino, propylamino, isopropylamino, phenylamino, or benzylamino. The term "alkylamino" may be defined as $NR_7R_8$, wherein at least one of $R_7$ and $R_8$ may be alkyl and the other may be alkyl or hydrogen. The term "arylamino" may be defined as $NR^9R^{10}$, wherein at least one of $R^9$ and $R^{10}$ may be aryl and the other may be aryl or hydrogen.

The term "halogen" or "halo," as used herein, refers to bromine, chlorine, fluorine, or iodine. In some embodiments, the halogen may be fluorine. In other embodiments, the halogen may be chlorine or bromine.

The various aspects and embodiments disclosed herein are for purposes of illustration and are not intended to be limiting, with the true scope and spirit being indicated by the following claims.

The invention claimed is:

1. An alkoxylated bio-oil polyol, the alkoxylated bio-oil polyol being produced by a process comprising alkoxylation of a bio-oil polyol at a temperature between about 80 degree Celsius (° C.) and about 180° C. in the presence of a cyclic alkylene oxide, the alkoxylated bio-oil polyol being characterized compared to the bio-oil polyol by one or more of: a reduced viscosity; an increased molecular weight; a lower gel permeation chromatography retention time; a weight percentage increase over a weight of the bio-oil polyol; and a reduced hydroxyl value; wherein the bio-oil is obtained from reaction of a bio-oil with a reagent polyol and the bio-oil is obtained from the pyrolysis of wood or other lignocellulosic-containing biomass.

2. The alkoxylated bio-oil polyol of claim 1, the alkoxylated bio-oil polyol being characterized compared to the bio-oil polyol by the reduced viscosity, the reduced viscosity being a percentage of a viscosity of the bio-oil of between about 1% and less than 100%.

3. The alkoxylated bio-oil polyol of claim 1, the alkoxylated bio-oil polyol being characterized compared to the bio-oil polyol by the increased molecular weight, the increased molecular weight being a percentage of a molecular weight of the bio-oil of between greater than 100% and less than about 200%.

4. The alkoxylated bio-oil polyol of claim 1, the alkoxylated bio-oil polyol being characterized compared to the bio-oil polyol by the weight percentage increase over the weight of the bio-oil polyol, the weight percentage increase over the weight of the bio-oil polyol between about 1% and about 100%.

5. The alkoxylated bio-oil polyol of claim 1, the alkoxylated bio-oil polyol being characterized compared to the bio-oil polyol by the reduced hydroxyl value, the reduced hydroxyl value being between about 1% and less than 100% of a number of free hydroxyl groups in the bio-oil polyol.

6. A method for preparing an alkoxylated bio-oil polyol, the method comprising alkoxylation of a bio-oil polyol at a temperature between about 80 degree Celsius (° C.) and about 180° C. in the presence of a cyclic alkylene oxide, wherein the bio-oil is obtained from reaction of a bio-oil with a reagent polyol and the bio-oil is obtained from the pyrolysis of wood or other lignocellulosic-containing biomass; and further wherein the alkoxylated bio-oil polyol, compared to the bio-oil polyol, is characterized by one or more of: a reduced viscosity; an increased molecular weight a lower gel permeation chromatography retention time; a weight percentage increase over a weight of the bio-oil polyol; and a reduced hydroxyl value.

7. The method of claim 6, the reaction conditions comprising one or more of: a presence of a catalytic alkali metal hydroxide or a catalytic alkali earth metal hydroxide or oxide; a presence of a catalytic amount of potassium hydroxide; a presence of an acidified lignin a presence of a catalyst in a weight % compared to a weight of the bio-oil polyol of between about 0.01 weight % and about 5 weight %; a temperature between about 80° C. and about 180° C.; and a pressure in pounds per square inch of between about 0 and about 600.

8. The method of claim 6, the bio-oil being produced by catalytic pyrolysis of wood or other lignocellulosic-containing biomass.

9. The method of claim 6, further comprising reacting a bio-oil with at least one of the bio-oil and a reagent polyol in the presence of a polyol-forming catalyst to provide the bio-oil polyol.

10. The method of claim 9, one or more of: the reagent polyol comprising one or more of: glycerol, ethylene glycol, propylene glycol, 1,3-propanediol, 2-methyl-1,3-propanediol, pentaerythritol, a sugar alcohol, an alcohol amine, a polyalkylene glycol, acidified and demethylated crude glycerol, and wet crude glycerol from steam splitting; the polyol-forming catalyst comprising tin; further comprising contacting an acidified lignin to one or more of: the bio-oil, the reagent polyol, and the polyol-forming catalyst; further comprising pyrolyzing biomass to provide the bio-oil or catalytically pyrolyzing biomass to provide the bio-oil as a catalytic bio-oil.

11. The alkoxylated bio-oil polyol of claim 1, wherein the reagent polyol comprises one or more of: glycerol, ethylene glycol, propylene glycol, 1,3-propanediol, 2-methyl-1,3-propanediol, pentaerythritol, a sugar alcohol, an alcohol amine, a polyalkylene glycol, acidified and demethylated crude glycerol, or wet crude glycerol from steam splitting.

12. The alkoxylated bio-oil polyol of claim 1, wherein the reagent polyol comprises glycerol.

13. The alkoxylated bio-oil polyol of claim 1, wherein the bio-oil is reacted with the reagent polyol in the presence of a polyol-forming catalyst.

14. The alkoxylated bio-oil polyol of claim 13, wherein the polyol-forming catalyst is tin (II) oxalate.

15. The alkoxylated bio-oil polyol of claim 1, wherein the bio-oil is obtained from the catalytic pyrolysis of wood or other lignocellulosic-containing biomass.

16. The alkoxylated bio-oil polyol of claim 1, wherein the bio-oil is obtained from the pyrolysis of wood.

17. The alkoxylated bio-oil polyol of claim 1, wherein the bio-oil is a bio-oil high in lignin content.

* * * * *